United States Patent
Sato et al.

(10) Patent No.: US 6,544,916 B1
(45) Date of Patent: Apr. 8, 2003

(54) MANUFACTURE METHOD OF DIELECTRIC CERAMIC COMPOSITION

(75) Inventors: Shigeki Sato, Tokyo (JP); Yoshihiro Terada, Tokyo (JP); Yoshinori Fujikawa, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/857,413

(22) PCT Filed: Oct. 4, 2000

(86) PCT No.: PCT/JP00/06902

§ 371 (c)(1),
(2), (4) Date: Jun. 4, 2001

(87) PCT Pub. No.: WO01/25164

PCT Pub. Date: Apr. 12, 2001

(30) Foreign Application Priority Data

Oct. 5, 1999 (JP) .......................................... 11-284591
Dec. 1, 1999 (JP) .......................................... 11-342152
Aug. 23, 2000 (JP) ...................................... 2000-252586

(51) Int. Cl.$^7$ ............................................ C04B 35/468
(52) U.S. Cl. ..................................... 501/137; 501/139
(58) Field of Search .................................. 501/137, 139

(56) References Cited

U.S. PATENT DOCUMENTS

| | | | |
|---|---|---|---|
| 5,219,812 A | 6/1993 | Doi et al. | |
| 6,074,970 A | 6/2000 | Yamashita et al. | |
| 6,226,172 B1 * | 5/2001 | Sato et al. | 361/311 |

FOREIGN PATENT DOCUMENTS

| | | |
|---|---|---|
| JP | A 2-83257 | 3/1990 |
| JP | A 4-264305 | 9/1992 |
| JP | A 4-292458 | 10/1992 |
| JP | A 4-292459 | 10/1992 |
| JP | A 4-295048 | 10/1992 |
| JP | A 5-109319 | 4/1993 |
| JP | 06-005460 | 1/1994 |
| JP | A 6-243721 | 9/1994 |
| JP | A 7-272973 | 10/1995 |
| JP | A 7-118431 | 12/1995 |
| JP | A 9-40465 | 2/1997 |
| JP | A 9-157021 | 6/1997 |
| JP | A 10-25157 | 1/1998 |
| JP | A 11-203405 | 7/1999 |
| JP | A 2000-103668 | 4/2000 |
| JP | A 2000-154057 | 6/2000 |
| JP | A 2001-31467 | 2/2001 |

OTHER PUBLICATIONS

U.S. patent application Ser. No. 09/673,957, Nomura et al., filed Oct. 24, 2000.

* cited by examiner

Primary Examiner—David Brunsman
(74) Attorney, Agent, or Firm—Oliff & Berridge, PLC

(57) ABSTRACT

A method of manufacturing a dielectric ceramic composition comprising at least $BaTiO_3$ as a main component, a second subcomponent having $SiO_2$ as a main component and at least one type selected from MO (note that M is at least one type of element selected from Ba, Ca, Sr and Mg), $Li_2O$ and $B_2O_3$ and other subcomponents, comprising the steps of mixing in the main component at least part of other subcomponents except for the second subcomponent to prepare a pre-calcination powder, calcining said pre-calcination powder to prepare a calcined powder, and mixing at least said second subcomponent in said calcined powder to obtain a dielectric ceramic composition having ratios of the subcomponents to $BaTiO_3$ as the main component of predetermined molar ratios.

22 Claims, 15 Drawing Sheets

0.1 um

600°C 0.1 um

900°C 0.1 um

1000°C 0.1 um

1100°C 0.1 um

MANUFACTURE METHOD OF DIELECTRIC CERAMIC COMPOSITION

This application is a 371 of PCT/JP00/06902 filed Oct. 4, 2000.

TECHNICAL FIELD

The present invention relates to a method of producing a dielectric ceramic composition having resistance to reduction, a specific permittivity of 1000 or more, a capacitance-temperature characteristic satisfying the X8R characteristic (within −55 to 150° C., within ΔC±15%) of the EIA standard, small dielectric loss, high permittivity, high insulation resistance and an excellent high temperature accelerated lifetime characteristic.

BACKGROUND ART

A multilayer ceramic capacitor is widely used as a compact, large capacitance, highly reliable electronic device, and the number used in one electronic device reaches large. In recent years, along with devicees becoming compact and high in performance, demands for still more compact, larger capacitance, lower price and more reliable multilayer ceramic capacitor have been getting furthermore stronger.

As a dielectric ceramic composition having a high permittivity and a flat capacitance-temperature characteristic, there is known a composition wherein $BaTiO_3$ is a main component and $Nb_2O_5$—$Co_3O_4$, MgO—Y, a rare-earth element (Dy, Ho, etc.), $Bi_2O_3$—$TiO_2$, etc. are added thereto. The temperature characteristic of the dielectric ceramic composition containing $BaTiO_3$ as a main component has difficulty in satisfying the R characteristic (ΔC=within ±15%) of the capacitance-temperature characteristic in a high temperature region of 130° C. or more because the Curie temperature of $BaTiO_3$ is near 120° C. Therefore, $Batio_3$ based material of high permittivity could fulfill only the X7R characteristic (−55 to 125° C., ΔC=within ±15%) of the EIA standard.

In recent years, a multilayer ceramic capacitor has come to be used in a variety of electronic devices, such as an engine electronic control unit (ECU) installed in an engine room, a crank angle sensor, anti-lock brake system (ABS) module in vehicles. Since these electronic devices are for stabilizing engine control, drive control and brake control, temperature stability of the circuit is required to be good.

An environment in which these electronic devices are used is considered that the temperature becomes about −20° C. or lower in winter in cold districts and the temperature rises up to about +130° C. or more after starting the engine in summer. Recently, the trends are to reduce wire harnesses connecting the electronic device with an apparatus as its object to control and the electronic device is provided outside a vehicle in some cases, so the environment has been getting more severe for the electronic device. Accordingly, a conventional dielectric ceramic composition having the X7R characteristic is unable to cope with such an application.

Also, as a capacitor material for temperature compensation excelling in the temperature characteristic, (Sr,Ca)(Ti, Zr)$O_3$ base, Ca(Ti,Zr)$O_3$ base, $Nd_2O_3$—$2TiO_2$ base, $La_2O_3$—$2TiO_2$ base, etc. are generally known, however, since these compositions have a very low specific permittivity (generally, not more than 100), it is substantially impossible to produce a capacitor having a large capacitance.

On the other hand, in a dielectric ceramic composition containing BaTio3 as a main component, there has been a proposal to shift the Curie temperature to a high temperature side by substituting Ba in $BaTiO_3$ by Bi, Pb, etc. so as to satisfy the X8R characteristic (the Japanese Unexamined Patent Publication Nos. 10-25157, 9-40465). Also, there has been proposed to satisfy the X8R characteristic by selecting a composition of $BaTiO_3$+$CaZrO_3$+ZnO+$Nb_2O_5$ base (the Japanese Unexamined Patent Publication Nos. 4-295048, 4-292458, 4-292459, 5-109319 and 6-243721). In any of these composition bases, however, since Pb, Bi and Zn easy to be evaporated and scattered are used, firing in an oxidizing atmosphere, such as in an air, becomes premise. As a result, there is a problem that inexpensive Ni or other base metals cannot be used as internal electrodes in the capacitor and expensive rare metals like Pd, Au, Ag, etc. have to be used.

To solve the problem, the present inventors have proposed a dielectric ceramic composition wherein Ni or Ni alloy can be used as internal electrodes in a capacitor (the Japanese Unexamined Patent Publication Nos. 10-2206, 11-206291 and 11-206292).

According to these techniques, by making rare-earth elements, such as Sc, Er, Tm, Yb, Lu, etc., contained in the dielectric ceramic composition, it becomes possible to shift the Curie temperature to the high temperature side and to flatten the capacitance-temperature change rate at the Curie temperature or higher, reliability (high temperature load lifetime, capacitance time change, etc.) can be improved.

However, a second phase containing a rare-earth element as a main component is apt to be segregated in the dielectric when increasing an amount of rare-earth element to be added to the dielectric ceramic composition. Due to the segregation of the second phase, strength of the dielectric was improved, but it was confirmed by the present inventor that the segregated second phase came to have about the same thickness as that of the dielectric layer of the multilayer capacitor depending on the thickness of the dielectric layer, and reliability of the capacitor was liable to be declined. Also, it was confirmed by the present inventors that a product (CR product) of the permittivity and the insulation resistance were apt to decline along with an increase of the amount of the second layer segregated in the dielectric layer.

Also, multilayer ceramic capacitor to be installed in vehicles has made progress in attaining large capacitance and compact size, and the trends are that the thickness of the dielectric layer is getting thinner. Therefore, particularly, in a dielectric ceramic composition wherein rare-earth element is added to dielectric ceramic composition, a technique to control the size and amount of the second phase to be segregated becomes necessary.

To improve reliability of a dielectric ceramic composition having the X7R characteristic, there is a proposal of a method of calcining $BaTiO_3$ as a main material and additives in advance (the Japanese Examined Patent Publication No. 7-118431). In the technique disclosed in the publication, it is considered that the composition of the finally composed dielectric composition becomes (Ba, Mg, Ca, Sr, Zn)(Ti, R)$O_3$+(Ca, Ba)ZrO$_3$+glass. Then, when assuming R=Sc, Y, Gd, Dy, Ho, Er, Yb, Tb, Tm and Lu, calcination of $BaTiO_3$ and the additives is performed so that the mole ratio expressed by (Ba+Mg+Ca+Sr+Zn)/(Ti+Zr+R) comes down to the range of 1.00 to 1.04.

In this method, however, it is considered as premise that alkaline earths (Mg, Ca, Sr, Ba) dissolves in a Ba site and rare-earth elements (R=Sc, Y, Gd, Dy, Ho, Er, Yb, Tb, Tm, Lu) dissolves in a Ti site. Thus, along with an increase of an amount of rare-earth elements to be added, it is necessary that an amount of the alkaline earth to be added is inevitably increased. Also, when the mole ratios in this composition base are specified as above, the high temperature load lifetime (IR lifetime) as the X8R characteristic ends up deteriorating. While, there arises a problem of deterioration in sintering when alkaline earth is increased in accordance therewith. Furthermore, Zn has a problem that it is easy to evaporate.

DISCLOSURE OF INVENTION

An object of the present invention is to provide a method of enabling to produce a dielectric ceramic composition preferably used as a dielectric ceramic composition for a multilayer chip capacitor wherein base metals like Ni, Ni alloy, etc. can be used for internal electrodes, segregation of different phases other than the main composition is controlled, the fine configuration of the dielectric is controlled, the capacitance-temperature characteristics satisfies the X8R characteristic, dielectric loss is small, permittivity and insulation resistance are high and the high temperature accelerated lifetime characteristic is excellent.

To attain the above object, according to the present invention, there is provided a method of manufacturing a dielectric ceramic composition, including at least a main component constituted by barium titanate;
a second component as a sintering aid; and
other subcomponents;
comprising the steps of:
mixing in said main component at least part of other subcomponents except for the second subcomponent to prepare a pre-calcination powder;
calcining said pre-calcination powder to prepare a calcined powder; and
mixing at least said second subcomponent in said calcined powder to obtain a dielectric ceramic composition having ratios of the subcomponents to the main component of predetermined molar ratios.

In the present invention, preferably, said barium titanate as the main component has a composition expressed by $Ba_m TiO_{2+m}$ where m is $0.995 \leq m \leq 1.010$ and a ratio of Ba and Ti is $0.995 \leq Ba/Ti \leq 1.010$; and said second subcomponent contains $SiO_2$ as a main component and at least one type selected from MO (note that M is at least one type of element selected from Ba, Ca, Sr and Mg), $Li_2O$ and $B_2O_3$.

In the present invention, more preferably, said second subcomponent is expressed by $(Ba, Ca)_x SiO_{2+x}$ (note that x=0.7 to 1.2). The second subcomponent is considered to work as a sintering aid.

When the second subcomponent has a composition expressed by $(Ba, Ca)_x SiO_{2+x}$ (note that x=0.7 to 1.2), the ratios of Ba and Ca in the second subcomponent may be any or only one of the two may be contained.

In the present invention, the above pre-calcination powder is preferably calcined at a temperature of 700 to 1100° C., more preferably at 800 to 1050° C. Note that the calcination may be performed for a plurality of times.

It is sufficient that the pre-calcination powder is mixed at least the second subcomponent, and in accordance with need, the main component and part of other subcomponents may be further mixed and the composition of the finally obtained dielectric ceramic composition becomes within the range below.

According to a first aspect of the present invention, preferably, said second subcomponent contains $SiO_2$ as a main component and at least one type selected from MO (note that M is at least one type of element selected from Ba, Ca, Sr and Mg), $Li_2O$ and $B_2O_3$;
said other subcomponents comprises at least
a first subcomponent containing at least one type selected from MgO, CaO, BaO, SrO and $Cr_2O_3$;
a third subcomponent containing at least one type selected from $V_2O_5$, $MoO_3$ and $WO_3$; and
a fourth subcomponent containing an oxide of R1 (note that R1 is at least one type selected from Sc, Er, Tm, Yb and Lu); and
said calcined powder is mixed at least said second subcomponent and ratios of the respective subcomponents with respect to 100 moles of said main component are:
the first subcomponent: 0.1 to 3 moles,
the second subcomponent: 2 to 10 moles,
the third subcomponent: 0.01 to 0.5 mole, and
the fourth subcomponent: 0.5 to 7 moles (where, the number of moles of the fourth subcomponent is the ratio of R1 by itself).

In the first aspect of the present invention, preferably, said pre-calcination powder is prepared so that the molar ratio of components contained in said pre-calcination powder; (Ba+metal element of the first subcomponent)/(Ti+metal element of the fourth subcomponent) is less than 1, or (Ba+metal element of the fourth subcomponent)/(Ti+metal element of the first subcomponent) is over 1, and calcination is performed.

In the second aspect of the present invention, preferably,
said second subcomponent contains $SiO_2$ as a main component and at least one type selected from MO (note that M is at least one type of element selected from Ba, Ca, Sr and Mg), $Li_2O$ and $B_2O_3$;
said other subcomponents comprises at least
a first subcomponent containing at least one type selected from MgO, CaO, BaO, SrO and $Cr_2O_3$;
a third subcomponent containing at least one type selected from $V_2O_5$, $MoO_3$ and $WO_3$; and
a fourth subcomponent containing an oxide of R1 (note that R1 is at least one type selected from Sc, Er, Tm, Yb and Lu); and
a fifth subcomponent containing an oxide of R2 (note that R2 is at least one type selected from Y, Dy, Ho, Tb, Gd and Eu); and
said calcined powder is mixed at least said second subcomponent and ratios of the respective subcomponents with respect to 100 moles of said main component are:
the first subcomponent: 0.1 to 3 moles,
the second subcomponent: 2 to 10 moles,
the third subcomponent: 0.01 to 0.5 mole,
the fourth subcomponent: 0.5 to 7 moles (where, the number of moles of the fourth subcomponent is the ratio of R1 by itself); and
the fifth subcomponent: 2 to 9 moles (where, the number of moles of the fifth subcomponent is the ratio of R2 by itself).

In the second aspect of the present invention, preferably, said pre-calcination powder is prepared so that the molar ratio of components contained in said pre-calcination powder; (Ba+metal element of the first subcomponent)/(Ti+metal element of the fourth subcomponent+metal element of the fifth subcomponent) is less than 1, or (Ba+metal element of the fourth subcomponent+metal element of the fifth subcomponent)/(Ti+metal element of the first subcomponent) is over 1, and calcination is performed.

In the second aspect of the present invention, it is preferable that the fifth subcomponent is contained in the pre-calcination powder at the time of preparing the pre-calcination powder. Also, when preparing the pre-calcination powder, it is preferable that the fourth subcomponent is not contained in the pre-calcination powder. Furthermore, when preparing the pre-calcination, it is preferable that the first subcomponent is always contained in the pre-calcination powder. Furthermore, preferably, the number of moles of the first subcomponent contained in said pre-calcination powder is smaller than the total number of moles of the fourth subcomponent and fifth subcomponent (note that the numbers of moles of the fourth subcomponent and fifth subcomponent are ratios of R1 by itself and R2 by itself, respectively).

According to a third aspect of the present invention, there is provided a method of manufacturing a dielectric ceramic composition, including at least a main component constituted by barium titanate;

a second component as a sintering aid;

a sixth subcomponent containing $CaZrO_3$ or $CaO+ZrO_2$; and other subcomponents;

comprising the steps of:
mixing in said main component said sixth subcomponent and at least part of other subcomponents except for the second subcomponent to prepare a pre-calcination powder;
calcining said pre-calcination powder to prepare a calcined powder; and
mixing at least said second subcomponent in said calcined powder to obtain a dielectric ceramic composition having ratios of the subcomponents to the main component of predetermined molar ratios.

According to a fourth aspect of the present invention, preferably, said other subcomponents comprises at least
a first subcomponent containing at least one type selected from MgO, CaO, BaO, SrO and $Cr_2O_3$;
a third subcomponent containing at least one type selected from $V_2O_5$, $MoO_3$ and $WO_3$; and
a fourth subcomponent containing an oxide of R1 (note that R1 is at least one type selected from Sc, Er, Tm, Yb and Lu); and said calcined powder is mixed at least said second subcomponent and ratios of the respective subcomponents with respect to 100 moles of said main component are:
the first subcomponent: 0.1 to 3 moles,
the second subcomponent: 2 to 10 moles,
the third subcomponent: 0.01 to 0.5 mole,
the fourth subcomponent: 0.5 to 7 moles (where, the number of moles of the fourth subcomponent is the ratio of R1 by itself); and
the sixth subcomponent: 0 to 5 moles (note that 0 is not included).

In the fourth aspect of the present invention, preferably, said pre-calcination powder is prepared so that the molar ratio of components contained in said pre-calcination powder; (Ba+Ca+metal element of the first subcomponent)/(Ti+Zr+R1) is less than 1, or (Ba+Ca+R1)/(Ti+Zr+metal element of the first subcomponent) is over 1, and calcination is performed.

According to a fifth aspect of the present invention, preferably, said other subcomponents comprises at least
a first subcomponent containing at least one type selected from MgO, CaO, BaO, SrO and $Cr_2O_3$;
a third subcomponent containing at least one type selected from $V_2O_5$, $MoO_3$ and $WO_3$; and
a fourth subcomponent containing an oxide of R1 (note that R1 is at least one type selected from Sc, Er, Tm, Yb and Lu); and
a fifth subcomponent containing an oxide of R2 (note that R2 is at least one type selected from Y, Dy, Ho, Tb, Gd and Eu); and said calcined powder is mixed at least said second subcomponent and ratios of the respective subcomponents with respect to 100 moles of said main component are:
the first subcomponent: 0.1 to 3 moles,
the second subcomponent: 2 to 10 moles,
the third subcomponent: 0.01 to 0.5 mole,
the fourth subcomponent: 0.5 to 7 moles (where, the number of moles of the fourth subcomponent is the ratio of R1 by itself);
the fifth subcomponent: 2 to 9 moles (where, the number of moles of the fifth subcomponent is the ratio of R2 by itself); and
the sixth subcomponent: 0 to 5 moles (note that 0 is not included).

According to the fifth aspect of the present invention, preferably, said pre-calcination powder is prepared so that the molar ratio of components contained in said pre-calcination powder (Ba+Ca+ metal element of the first subcomponent)/(Ti+Zr+R1+R2) is less than 1, or (Ba+Ca+R1+R2)/(Ti+Zr+metal element of the first subcomponent) is over 1, and calcination is performed.

In the fifth aspect of the present invention, it is preferable that the fifth subcomponent is always contained in the pre-calcination powder at the time of preparing the pre-calcination powder. It is also preferable that the first subcomponent is always contained in the pre-calcination powder when preparing the pre-calcination powder. It is further preferable that the first subcomponent, fourth subcomponent and the fifth subcomponent are always contained in the pre-calcination powder when preparing the pre-calcination powder. Furthermore, preferably, the number of moles of the first subcomponent contained in said pre-calcination powder is smaller than the total number of moles of the fourth subcomponent and fifth subcomponent (note that the numbers of moles of the fourth subcomponent and fifth subcomponent are ratios of R1 by itself and R2 by itself, respectively).

In a conventional method of producing a dielectric ceramic composition, barium titanate and additives were once mixed to produce mixed powder of the dielectric ceramic composition or a dielectric paste. In this method, however, segregation of additives, etc. (first to sixth subcomponents) occurs in the dielectric ceramic composition after firing and unevenness arises in the composition between respective crystals. Due to the segregation, permittivity of the dielectric and insulation resistance deteriorate.

According to the present invention, by mixing a main component with at least one of a first subcomponent, third subcomponent, fourth subcomponent, fifth subcomponent and sixth subcomponent excepting a second subcomponent and calcining, unevenness in the composition between respective crystal particles is suppressed, consequently, it is possible to produce a dielectric ceramic composition wherein deposition of a segregation phase is suppressed, a size of the segregation phase is controlled, the X8R characteristic is satisfied, the insulation resistance and specific permittivity are improved and excellent reliability is attained. These were found for the first time by the present inventors.

Also, according to the present invention, in the case of adding two kinds or more of rare-earth elements (fourth subcomponent and fifth subcomponent) in the dielectric ceramic composition, by always making the fifth subcomponent contained in the powder before calcination, it is possible to produce a dielectric ceramic composition having excellent reliability wherein deposition of a segregation phase is suppressed, a size of the segregation is controlled, the CR product and reliability are improved while the X8R characteristic is satisfied. This was also discovered for the first time by the present inventors.

Furthermore, according to the present invention, by making the sixth subcomponent contained in the dielectric ceramic composition, there are an effect of shifting the Curie temperature to the higher temperature side and an effect of flattening the capacitance-temperature characteristic. Also, there is an effect of improving the CR product and strength against direct-current insulation breakdown.

As explained above, since a capacitor produced by the method according to the present invention is able to satisfy the X8R characteristic of the EIA standard, it can be used under an environment such as being exposed to a high temperature as in an engine room of vehicles. Also, since a dielectric ceramic composition obtained by the production method according to the present invention does not contain element which is liable to be evaporated and dispersed, such as Pb, Bi and Zn, it is possible to be subjected to firing in a reducing atmosphere. Therefore, it becomes possible to use base metals, such as Ni and Ni alloy as an internal electrode so a lower cost can be attained.

Also, a dielectric ceramic composition obtained by the production method of the present invention satisfies the X8R characteristic in firing under a reducing atmosphere, has small deterioration in capacitance-aging characteristic and insulation resistance under direct-current electric-field application and excels in reliability, as well. Therefore, an effect can be expected as a method of suppressing deterioration of the temperature change rate in a high temperature range even if a multilayer capacitor is getting thinner.

Also, since a dielectric ceramic composition obtained by the production method of the present invention does not contain substances like Pb, Bi, etc., it is possible to provide a product which has a small adverse influence on an environment by disposal after using.

Also, in a production method according to the present invention, it is possible to realize a dielectric ceramic composition having a uniformed composition with a little different phases formed by segregation of additives, by which the permittivity and insulation resistance of the dielectric ceramic composition can be improved. Also, in the production method of the present invention, since it is possible to prevent structural default which accidentally occurs, a multilayer ceramic capacitor having a high reliability can be provided.

Furthermore, since it is possible to suppress segregation of different phases without changing the composition of additives, a dielectric ceramic composition wherein the capacitance-temperature characteristic satisfying the X8R characteristic can be easily produced.

BRIEF DESCRIPTION OF THE DRAWINGS

Below, the present invention will be explained in detail based on an embodiment shown in the drawings, in which.

BEST MODE FOR WORKING THE INVENTION

Multilayer Ceramic Capacitor Before explaining the method of manufacturing a dielectric ceramic composition according to the present invention, an explanation will be given of a multilayer ceramic capacitor.

Figure 1:
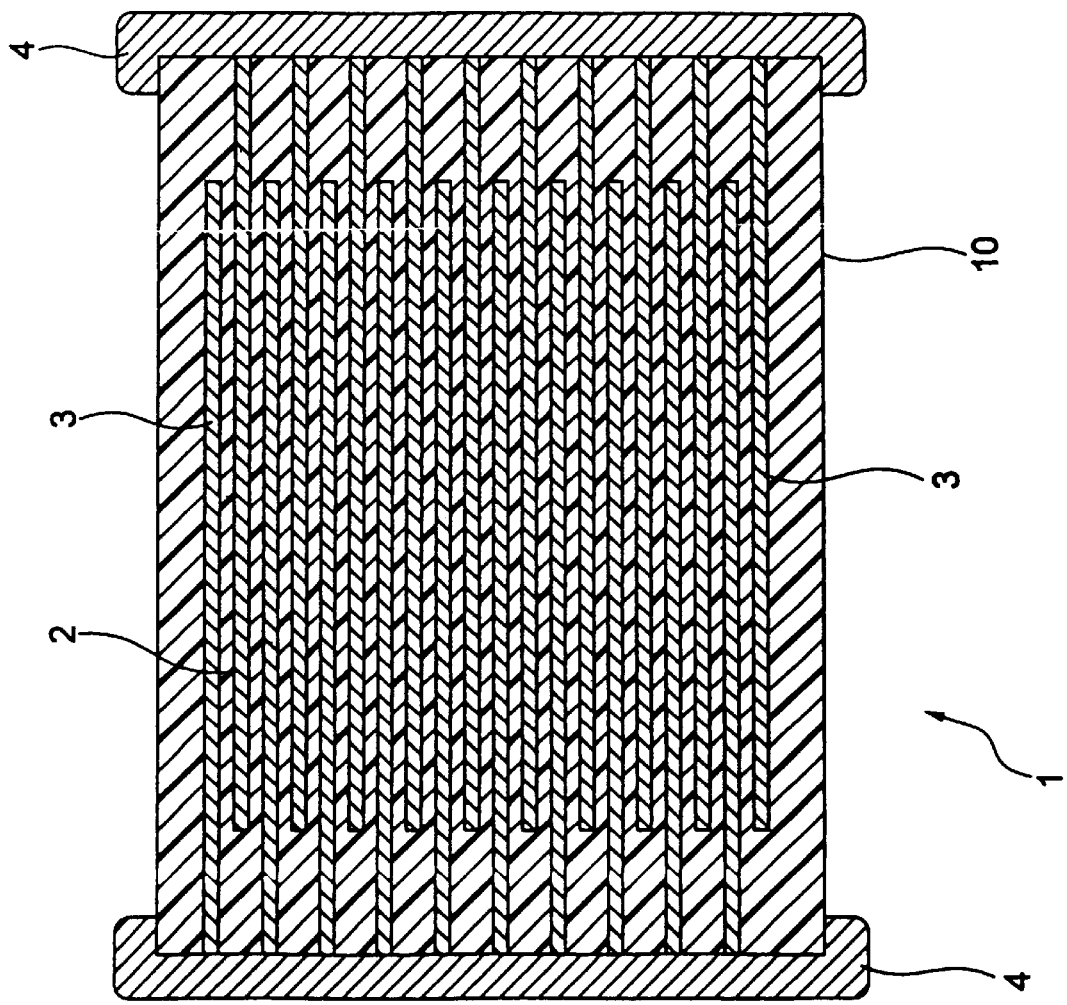
FIG. 1 is a sectional view of a multilayer ceramic capacitor.

As shown in FIG. 1, a multilayer ceramic capacitor 1 according to an embodiment of the present invention has a capacitor device body 10 of configuration of dielectric layers 2 and internal electrode layers 3 stacked alternately. At the two ends of the capacitor device body 10 are formed a pair of external electrodes 4 conductive with the internal electrode layers 3 alternately arranged inside the device body 10. The shape of the capacitor device body 10 is not particularly limited, but normally is made a parallelepiped. Further, the dimensions are not particularly limited and may be made suitable dimensions in accordance with the application. Usually, however, they are about (0.6 to 5.6 mm)×(0.3 to 5.0 mm)×(0.3 to 1.9 mm).

The internal electrode layers 3 are stacked so that end faces thereof alternately expose out to the surfaces of the two opposing ends of the capacitor device body 10. The pair of external electrodes 4 are formed at the two ends of the capacitor device body 10 and are connected to the exposed end faces of the alternately arranged internal electrode layers 3 so as to form a capacitor circuit.

Dielectric Layers 2

A dielectric layer 2 contains the dielectric ceramic composition obtained by the method of manufacture of the present invention.

The dielectric ceramic composition obtained by the method of manufacture according to the embodiment of the present invention is comprised of a dielectric ceramic composition comprising at least:

- a main component containing barium titanate,
- a first subcomponent including at least one type of compound selected from MgO, CaO, BaO, SrO, and $Cr_2O_3$,
- a second subcomponent including $SiO_2$ as a main component and one type of compound selected from MO (note that M is at least one type of element selected from Ba, Ca, Sr and Mg), $Li_2O$ and $B_2O_3$;
- a third subcomponent including at least one type of compound selected from $V_2O_5$, $MoO_3$, and $WO_3$,
- a fourth subcomponent including an oxide of "R1" (where, "R1" is at least one type of element selected from Sc, Er, Tm, Yb and Lu), and
- a sixth subcomponent as an optional component including $CaZrO_3$ or $CaO+ZrO_2$.

The ratios of the above respective subcomponents to barium titanate as the main component are, with respect to 100 moles of barium titanate:

- the first subcomponent: 0.1 to 3 moles,
- the second subcomponent: 2 to 10 moles,
- the third subcomponent: 0.01 to 0.5 moles,
- the fourth subcomponent: 0.5 to 7 moles, and
- the sixth subcomponent: 0 to 5 moles (0 is not included), preferably,

- the first subcomponent: 0.5 to 2.5 moles,
- the second subcomponent: 2.0 to 5.0 moles,
- the third subcomponent: 0.1 to 0.4 moles,
- the fourth subcomponent: 0.5 to 5.0 moles, and
- the sixth subcomponent: 0.5 to 3 moles.

Note that the above ratio of the fourth subcomponent is not the molar ratio of the RI oxide, but the molar ratio of R1 alone. That is, when for example using an oxide of Yb as the fourth subcomponent, the ratio of the fourth subcomponent of 1 mole does not mean the ratio of the $Yb_2O_3$ is 1 mole, but the ratio of Yb is 1 mole.

In this specification, the respective oxides constituting the main component and the subcomponents are expressed by stoichiochemical compositions, but the oxidized state of the oxides may also deviate from the stoichiochemical compositions. The above ratios of the subcomponents, however, are found by conversion from the amounts of the metals contained in the oxides constituting the subcomponents to the oxides of the above stoichiochemical compositions. Further, it is possible to use the above oxides and their mixtures and composite oxides as powder materials of the dielectric ceramic composition, but it is also possible to suitably select, mix, and use various compounds changing to the above oxides or composite oxides after firing, for example, carbonates, oxalate, nitrates, hydroxides, and organic metal compounds may be used.

The reasons for limiting the contents of the above subcomponents are as follows.

If the content of the first subcomponent (MgO, CaO, BaO, SrO, and $Cr_2O_3$) is too small, the capacitance-temperature changing rate ends up becoming large. On the other hand, if the content is too large, sinterability deteriorates and the IR lifetime tends to become short. Note that the ratios of the oxides in the first subcomponent may be any ratios.

If the content of the second subcomponent is too small, the capacitance-temperature characteristic becomes poor and the IR (insulation resistance) declines. On the other hand, if the content is too great, the IR lifetime becomes insufficient and an abrupt drop of the permittivity occurs.

The second subcomponent mainly works as a sintering aid, but it also has an effect of improving default rate of initial insulation resistance at the time of making the dielectric layer thinner.

Preferably, the above second subcomponent is expressed by $(Ba,Ca)_xSiO_{2+x}$ (note that x=0.7 to 1.2). The BaO and the CaO in the second subcomponent $[(Ba,Ca)_xSiO_{2+x}]$ as a more preferable state are also contained in the first subcomponent, but the composite oxide $(Ba,Ca)_xSiO_{2+x}$ has a low melting point, so it has good reactivity with the main component. Therefore, in the present invention, preferably, the BaO and/or CaO are also added as the above composite oxide. The "x" in the $(Ba,Ca)_xSiO_{2+x}$ as a more preferable state is preferably 0.7 to 1.2, more preferably 0.8 to 1.1. If the "x" is too small, that is, if the content of $SiO_2$ is too great, the main component of $Ba_mTiO_{2+n}$ will be reacted with and the dielectric property will end up deteriorating. On the other hand, if the "x" is too large, the melting point will become high and the sinterability will be deteriorated, so this is not preferable. Note that the ratios of Ba and Ca in the second subcomponent are any ratios. A subcomponent containing just one of Ba and Ca is also possible.

The third subcomponent ($V_2O_5$, $MoO_3$, and $WO_3$) exhibits an effect of flattening the capacitance-temperature characteristic at a Curie temperature or more and an effect of improving the IR lifetime. If the content of the third subcomponent is too small, these effects become insufficient. On the other hand, when the content is too great, the IR remarkably declines. Note that the composition ratios of the oxides in the third subcomponent may be any.

The fourth subcomponent (R1 oxide) exhibits an effect of shifting the Curie temperature to the high temperature side and an effect of flattening the capacitance-temperature characteristic. If the content of the fourth subcomponent is too small, these effects become insufficient and the capacitance-temperature characteristic ends up deteriorating. On the other hand, if the content is too large, the sinterability tends to deteriorate. Among the fourth subcomponents, a Yb oxide is preferred since it has a high effect on improvement of the characteristic and further is inexpensive in cost.

The dielectric ceramic composition of the present invention preferably contains, in accordance with need, an R2 oxide (note that R2 is at least one type selected from Y, Dy, Ho, Tb, Gd and Eu) as a fifth subcomponent. The fifth subcomponent (the R2 oxide) exhibits the effect of improving the IR and IR lifetime and has a little adverse effect on the capacitance-temperature characteristic. If the content of the fifth subcomponent is too large, however, the sinterability tends to deteriorate. Among the fifth subcomponents, a Y oxide is preferred since it has a high effect on improvement of the characteristic and further is inexpensive in cost.

The ratio of a total content of the fourth subcomponent and the fifth subcomponent is preferably 13 moles or less, more preferably, 10 moles or less to 100 moles of $BaTiO_3$ as the main component (note that the ratio of the fourth subcomponent and the fifth subcomponent is the molar ratio of R1 and R2 alone). It is for maintaining preferable sinterability.

The dielectric ceramic composition of the present embodiment contains $CaZrO_3$ or $CaO+ZrO_2$ as the sixth subcomponent in accordance with need. In the sixth subcomponent, the molar ratios of Ca and Zr may be any, but preferably, Ca/Zr=0.5 to 1.5, more preferably, Ca/Zr=0.8 to 1.5, in particular, Ca/Zr=0.9 to 1.1.

Figure 2:
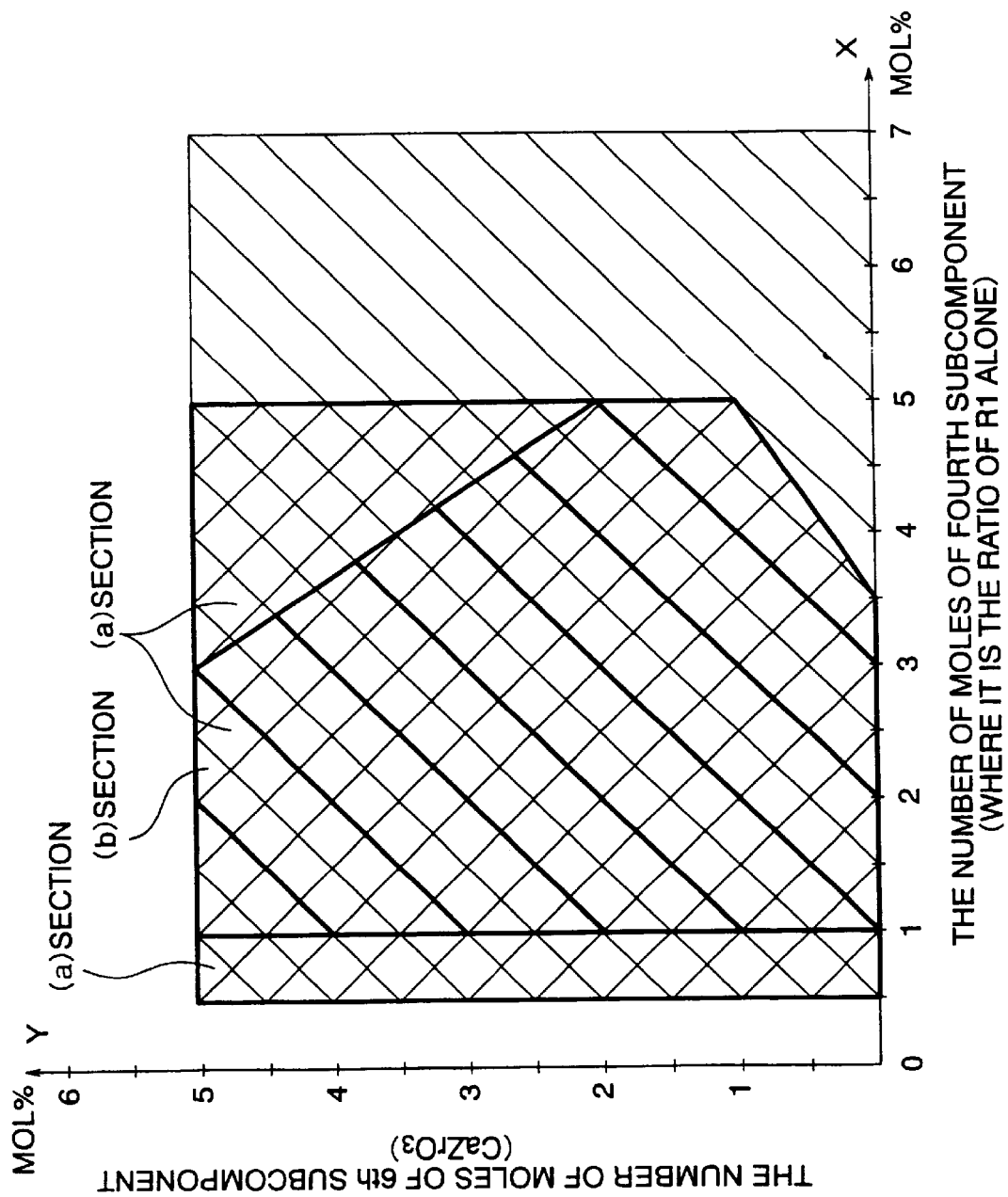
FIG. 2 is a graph of a preferable relationship between a fourth subcomponent and sixth subcomponent in a dielectric ceramic composition S according to an embodiment of the present invention.
Figure 3:
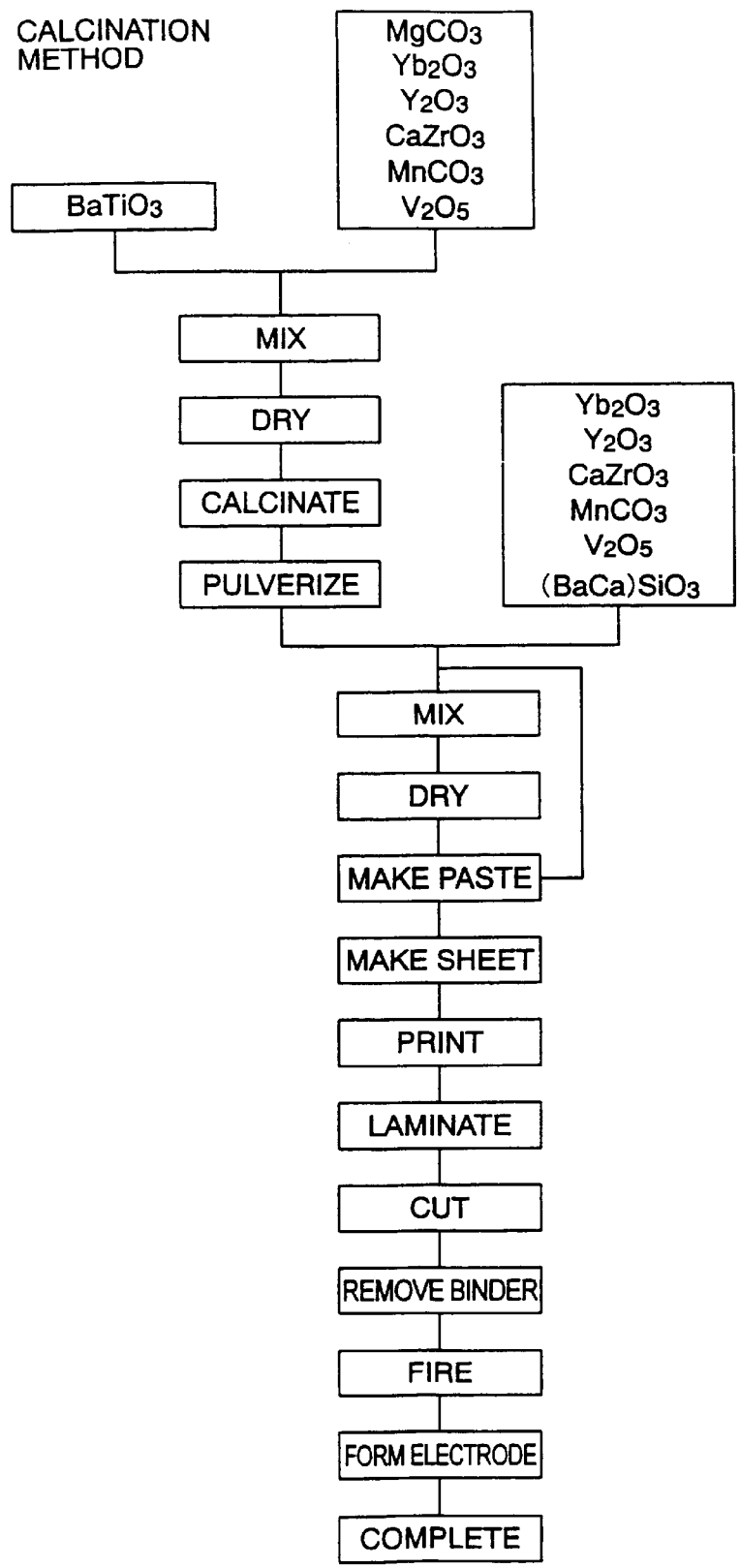
FIG. 3 is a flow chart of a method of producing the capacitor shown in FIG. 1 according to the embodiment of the present invention.

In this case, when expressing the ratios of the fourth subcomponent and the sixth subcomponent to 100 moles of $BaTiO_3$ as the main component by the X-coordinate and Y-coordinate, respectively (note that the ratio of the fourth subcomponent is the molar ratio of R1 alone), preferably, they are in a relationship of being within a range surrounded by straight lines of Y=5, Y=0, Y=(2/3)X−(7/3), X=0.5 and X=5 (note that a boundary line of Y=0 is not included, that is, it corresponds to an "a" section including boundaries except for the boundary Y=0 in FIG. 2).

Further preferably, when expressing the ratios of the fourth subcomponent and the sixth subcomponent to 100 moles of $BaTiO_3$ as the main component by the X-coordinate and Y-coordinate, respectively (note that the ratio of the fourth subcomponent is the molar ratio of R1 alone), preferably, they are in a relationship of being within a range surrounded by straight lines of Y=5, Y=0, Y=(2/3)X−(7/3), Y=−(1.5)X+9.5, X=1 and X=5 (note that a boundary line of Y=0 is not included, that is, it corresponds to a "b" section including boundaries except for the boundary Y=0 in FIG. 2).

The sixth subcomponent ($CaZrO_3$ or $CaO+ZrO_2$) exhibits an effect of shifting the Curie temperature to the high temperature side and an effect of flattening the capacitance-temperature characteristic. Also, there is an effect of improving the CR product and direct-current insulation breakdown strength. Note that when a content of the sixth subcomponent is too much, the IR accelerated lifetime remarkably declines and the capacitance-temperature characteristic (X8R characteristic) ends up deteriorating. Accordingly, the content of the sixth subcomponent to 100 moles of $BaTiO_3$ is preferably 0 to 5 moles (note that 0 is not included), more preferably, 0.5 to 3 moles.

An additive form of $CaZrO_3$ is not particularly limited, and oxides like CaO constituted by Ca, carbonate like $CaCO_3$, organic compounds, $CaZrO_3$, etc. can be mentioned.

By adjusting the content of the fourth subcomponent (R1 oxide) and the sixth subcomponent ($CaZrO_3$, etc.), the capacitance-temperature characteristic (X8R characteristic) can be made flat and the high temperature accelerated lifetime and CR product can be improved. Particularly, in the above value ranges, segregation of different phases can be suppressed and the structure can be uniform. When the content of the fourth subcomponent and/or fifth subcomponent is too much, a pyrochlore phase as an acicula is easy to be deposited and deterioration of characteristic (reduction of the CR product) tends to be observed when the thickness between dielectric layers of a multilayer ceramic capacitor is made thinner. On the other hand, when the content of the fourth subcomponent and/or fifth subcomponent is too small, there is a tendency that the capacitance-temperature characteristic becomes unable to be satisfied.

Also, the dielectric ceramic composition of the present invention may contain MnO as a seventh subcomponent. The seventh subcomponent exhibits effects of promoting sintering, improving the IR and the IR lifetime. To obtain the effects sufficiently, the ratio of the seventh subcomponent to 100 moles of barium titanate is preferably 0.01 mole or more. Note that when the content of the seventh subcomponent is too much, there is an adverse effect on the capacitance-temperature characteristic, so it is preferably 0.5 mole or less.

Further, the dielectric ceramic composition of the present invention may also contain $Al_2O_3$ in addition to the above oxides. $Al_2O_3$ does not have much of an adverse effect on the capacitance-temperature characteristic and exhibits the effect of improvement of the sinterability, IR, and IR lifetime. If the content of the $Al_2O_3$ is too large, however, the sinterability deteriorates and the IR falls, so the $Al_2O_3$ is preferably included in an amount of not more than 1 mole with respect to 100 moles of $BaTiO_3$, more preferably no more than 1 mole of the dielectric ceramic composition as a whole.

Note that when at least one element of Sr, Zr, and Sn replaces the Ba or Ti in the main component constituting the perovskite structure, the Curie temperature shifts to the low temperature side, so the capacitance-temperature characteristic above 125° C. deteriorates. Therefore, it is preferable not to use a $BaTiO_3$ containing these elements [for example, $(Ba,Sr)TiO_3$] as a main component. There is however no particular problem with a level contained as an impurity (less than 0.1 mol % of the dielectric ceramic composition as a whole).

The average grain size of the dielectric ceramic composition of the present invention is not particularly limited and may be suitably determined in accordance with the thickness of the dielectric layers etc. from the range of for example 0.1 to 3.0 $\mu m$. The capacitance-temperature characteristic deteriorates, the thinner the dielectric layers and tends to deteriorate the smaller the average grain size. Therefore, the dielectric ceramic composition of the present invention is particularly effective when having to make the average grain size small, specifically, when the average grain size is 0.1 to 0.5 $\mu m$. Further, if the average grain size is made small, the IR lifetime becomes longer and further the change in the capacitance under a DC electric field over time becomes smaller, so it is preferable that the average grain size be small as explained above from this viewpoint as well.

The Curie temperature (a phase transition temperature from ferroelectrics to paraelectric) of the dielectric ceramic composition of the present invention can be changed by selecting a composition, but it is preferably 120° C. or more, in particular, 123° C. or more in order to satisfy the X8R characteristic. Note that the Curie temperature can be measured by DSC(differential scanning calorimetry).

The thickness of the dielectric layer comprised of the dielectric ceramic composition of the present invention is usually 40 $\mu m$ or less, in particular, 30 $\mu m$ or less per one layer. The lower limit of the thickness is normally about 2 $\mu m$. The dielectric ceramic composition of the present invention is effective in improving the capacitance-temperature characteristic of a multilayer ceramic capacitor having a dielectric layer made to be thin as such. Note that the number of layers stacked in the dielectric layer is normally about 2 to 300.

The multilayer ceramic capacitor using the dielectric ceramic composition of the present invention is suitable for use as an electronic device for an equipment used at an environment of 80° C. or more, in particular, 125° C. to 150° C. In this temperature range, the temperature characteristic of a capacitance satisfies the R characteristic of the EIA standard, and furthermore, satisfies the X8R characteristic. Also, it is possible to satisfy the B characteristic of the EIAJ standard [rate of change of capacitance of within ±10% at −25 to 85° C. (reference temperature 20° C.)] and the X7R characteristic of the EIA standard (−55 to 125° C., $\Delta C$=within ±15) simultaneously.

In a multilayer ceramic capacitor, the dielectric layers are normally subjected to an AC electric field of at least 0.02V/$\mu$m, in particular at least 0.2V/$\mu$m, further at least 0.5V/$\mu$m to generally not more than 5V/$\mu$m and a DC electric field of not more than 5V/$\mu$m superposed over this, but the temperature characteristic of the capacitance is extremely stable even when such electric fields are applied.

Internal Electrode Layers 3

The electroconductive material contained in the internal electrode layers 3 is not particularly limited, but a base metal may be used since the material constituting the dielectric layers 2 has resistance to reduction. As the base metal used as the electroconductive material, Ni or an Ni alloy is preferable. As the Ni alloy, an alloy of at least one type of element selected from Mn, Cr, Co, and Al with Ni is preferable. The content of the Ni in the alloy is preferably not less than 95 wt %.

Note that the Ni or Ni alloy may contain P and other various types of trace components in amounts of not more than 0.1 wt % or so.

The thickness of the internal electrode layers may be suitably determined in accordance with the application etc., but is usually 0.5 to 5 $\mu$m, preferably 0.5 to 2.5 $\mu$m or so.

External Electrodes 4

The electroconductive material contained in the external electrodes 4 is not particularly limited, but in the present invention inexpensive Ni, Cu, or alloys of the same may be used.

The thickness of the external electrodes may be suitably determined in accordance with the application etc., but is usually 10 to 50 $\mu$m or so.

Method of Manufacturing Multilayer Ceramic Capacitor

The multilayer ceramic capacitor produced by using the method of manufacturing a dielectric ceramic composition according to the present invention comprises the steps of preparing a green chip by using the usual printing method or sheet method which uses pastes, firing the green chip, then printing or transferring and sintering the external electrodes. The method of manufacture will be explained in detail below.

First, a powder of a dielectric ceramic composition included in a dielectric paste is prepared. In the present invention, before obtaining the above powder of the dielectric ceramic composition, calcination is performed. That is, at least one component from among all components other than the second subcomponent (for example, $(Ba,Ca)_xSiO_{2+x}$), that is, the main component (for example, $BaTiO_3$), the first subcomponent (for example, $MgCo_3$), the third subcomponent (for example, $V_2O_5$), the fourth subcomponent (for example, $Yb_2O_3$), the fifth subcomponent (for example, $Y_2O_3$), and the sixth subcomponent (for example, $CaZrO_3$) is mixed and dried to prepare a pre-calcination powder.

The pre-calcination powder is then calcined. The calcination conditions are not particularly limited, but the calcination is preferably performed under the following conditions:

Rate of temperature rise: 50 to 400° C./hour, in particular 100 to 300° C./hour

Holding temperature: 700 to 1100° C., in particular 700 to 900° C.

Temperature holding time: 0.5 to 6 hours, in particular 1 to 3 hours Atmosphere: in the air or in nitrogen The calcined powder is roughly pulverized by an alumina roll etc., then at least the second subcomponent (for example, $(Ba,Ca)_xSiO_{2+x}$) is added and, according to need, the remaining additives are added to obtain the mixed powder of the above final composition. Next, the mixed powder is according to need mixed by a ball mill etc. and dried so as to obtain a powder of a dielectric ceramic composition having the composition of the present invention.

Next, the powder of the dielectric ceramic composition is made into a coating to prepare a dielectric layer paste. The dielectric layer paste may be an organic-based coating obtained by mixing the powder of the dielectric ceramic composition and an organic vehicle or may be a water-based coating.

As the dielectric ceramic composition powder, the above oxides, mixture of the same and composite oxides may be used, and in addition to these, it may be suitably selected from a variety of compounds which become the above oxide or composite oxide by firing, for example, carbonate, oxalate, nitrates, hydroxides, organic metal compound, etc., mixed for use. A content of the compounds in the dielectric ceramic composition powder may be determined so that the composition of the above dielectric ceramic composition can be attained after firing.

An average grain diameter of the dielectric ceramic composition powder is usually 0.1 to 3 $\mu$m in a state before being made to be a paste.

The organic vehicle is comprised of a binder dissolved in an organic solvent. The binder used for the organic vehicle is not particularly limited, but may be suitably selected from ethyl cellulose, polyvinyl butyral, and other ordinary types of binders. Further, the organic solvent used is also not particularly limited and may be suitably selected from terpineol, butyl carbitol, acetone, toluene, and other organic solvents in accordance with the printing method, sheet method, or other method of use.

Further, when using a water-based coating as the dielectric layer paste, it is sufficient to knead a water-based vehicle comprised of a water-based binder or dispersant etc. dissolved in water together with the dielectric layer ingredient. The water-based binder used for the water-based vehicle is not particularly limited. For example, a polyvinyl alcohol, cellulose, water-soluble acrylic resin, etc. may be used.

The internal electrode layer paste is prepared by kneading the electroconductive material comprised of the above various types of electroconductive metals and alloys or various types of oxides, an organic metal compound, resinate, etc., which will change to the above electroconductive materials after firing, together with the above organic vehicle.

The external electrode paste may be prepared in the same way as the above internal electrode layer paste.

The content of the organic vehicle in the above pastes is not particularly limited and may fall within the usual content, for example, the binder may be contained in an amount of 1 to 5 wt % or so and the solvent 10 to 50 wt % or so. Further, the pastes may include, in accordance with need, various types of additives selected from dispersants, plasticizers, dielectrics, insulators, etc. The total content of these is preferably not more than 10 wt %.

When using a printing method, the dielectric layer paste and the internal electrode layer paste are successively printed on the PET or other substrate. The result is then cut into a predetermined shape, then the pastes are peeled off from the substrate to form a green chip.

Further, when using a sheet method, a dielectric layer paste is used to form a green sheet, the internal electrode layer paste is printed on top of this, then these are stacked to form a green chip.

Before firing, the green chip is processed to remove the binder. This processing for removing the binder may be performed under ordinary conditions. If Ni or an Ni alloy or another base metal is used for the electroconductive material of the internal electrode layers, the processing is preferably performed under the following conditions:

Rate of temperature rise: 5 to 300° C./hour, in particular 10 to 100° C./hour

Holding temperature: 180 to 400° C., in particular 200 to 300° C.

Temperature holding time: 0.5 to 24 hours, in particular 5 to 20 hours

Atmosphere: in the air

The atmosphere when firing the green chip may be suitably determined in accordance with the type of the electroconductive material in the internal electrode layer paste, but when using Ni or an Ni alloy or another base metal as the electroconductive material, the oxygen partial pressure in the firing atmosphere is preferably made $10^{-8}$ to $10^{-12}$ atmospheres. If the oxygen partial pressure is less than this range, the electroconductive material of the internal electrode layers becomes abnormally sintered and ends up breaking in the middle in some cases. Further, if the oxygen partial pressure is more than the above range, the internal electrode layers tend to oxidize.

Further, the holding temperature at the time of firing is preferably 1100 to 1400° C., more preferably 1200 to 1360° C., still more preferably 1200 to 1340° C. If the holding temperature is less than the above range, the densification becomes insufficient, while if over that range, there is a tendency toward breaking of the electrodes due to abnormal sintering of the internal electrode layers, deterioration of the capacitance-temperature characteristic due to dispersion of the material comprising the internal electrode layers, and reduction of the dielectric ceramic composition.

The various conditions when firing other than the above conditions are preferably selected from the following ranges:

Rate of temperature rise: 50 to 500° C./hour, in particular 200 to 300° C./hour

Temperature holding time: 0.5 to 8 hours, in particular 1 to 3 hours

Cooling rate: 50 to 500° C./hour, in particular 200 to 300° C./hour

Note that the firing atmosphere is preferably a reducing atmosphere. As the atmospheric gas, for example, it is preferable to use a wet mixed gas of $N_2$ and $H_2$.

When firing in a reducing atmosphere, the capacitor device body is preferably annealed. The annealing process is for reoxidizing the dielectric layers. Since this enables the IR lifetime to be remarkably prolonged, the reliability is improved.

The oxygen partial pressure in the annealing atmosphere is $10^{-9}$ or more, preferably $10^{-6}$ or more, in particular, $10^{-5}$ to $10^{-4}$ atmospheres. If the oxygen partial pressure is less than the above range, reoxidation of the dielectric layers is difficult, while if over that range, the internal electrode layers tend to oxide.

The holding temperature at the time of annealing is 1100° C. or less, preferably 500 to 1100° C. If the holding temperature is less than the above range, the oxidation of the dielectric layers becomes insufficient, so the IR tends to become low and the IR lifetime short. On the other hand, when the holding temperature exceeds the above range, not only do the internal electrode layers oxidize and the capacitance fall, but also the internal electrode layers end up reacting with the dielectric material resulting in a tendency toward deterioration of the capacitance-temperature characteristic, a fall in the IR, and a fall in the IR lifetime. Note that the annealing may be comprised of only a temperature raising process and temperature reducing process. That is, the temperature holding time may also be made zero. In this case, the holding temperature is synonymous with the maximum temperature.

The various conditions when annealing other than the above conditions are preferably determined from the following ranges:

Temperature holding time: 0 to 20 hours, in particular 6 to 10 hours

Cooling rate: 50 to 500° C./hour, in particular 100 to 300° C./hour

Note that for the atmospheric gas, wet $N_2$ gas etc. is preferably used.

In the processing for removing the binder, the firing, and the annealing, for example, a wetter etc. may be used to wet the $N_2$ gas or mixed gas. In this case, the temperature of the water is preferably 5 to 75° C.

The processing for removing the binder, firing, and annealing may be performed consecutively or independently. When performing these consecutively, preferably, after processing to remove the binder, the atmosphere is changed without cooling, then the temperature is raised to the holding temperature for firing, the firing performed, then the chip is cooled, the atmosphere is changed when the holding temperature of the annealing is reached, and then annealing is performed. On the other hand, when performing these independently, at the time of firing, preferably the temperature is raised to the holding temperature at the time of the processing for removing the binder in an $N_2$ gas or wet $N_2$ gas atmosphere, then the atmosphere is changed and the temperature is further raised. Preferably, the chip is cooled to the holding temperature of the annealing, then the atmosphere changed again to an $N_2$ gas or wet $N_2$ gas atmosphere and the cooling continued. Further, at the time of annealing, the temperature may be raised to the holding temperature in a $N_2$ gas atmosphere, then the atmosphere changed or the entire annealing process may be performed in a wet $N_2$ gas atmosphere.

The thus obtained capacitor device body is, for example, end polished using barrel polishing or sandblasting etc., then printed or transferred with an external electrode paste and fired to form the external electrodes 4. The firing conditions of the external electrode paste are for example preferably 600 to 800° C. for 10 minutes to 1 hour or so in a wet mixed gas of $N_2$ and $H_2$. Further, in accordance with need, the surfaces of the external electrodes 4 may be formed with a covering layer using a plating technique, etc.

The multilayer ceramic capacitor of the present invention produced in this way is used at a temperature of at least 80° C., in particular, 125° C. or more and not higher than 150° C. The capacitance-temperature change rate satisfies the R characteristic of the EIA standard at the temperature of 125° C. or more and not higher than 150° C., as well. Also, the capacitance temperature change rate is stable even when being applied an AC electric field of at least 0.02V/μm, in particular at least 0.2V/μm, further, 0.5V/μm and a DC electric field of not more than 5V/μm superposed over this.

The thus produced multilayer ceramic capacitor of the present invention is mounted by soldering, etc. onto a printed circuit board for use in various types of electronic equipments.

Note that the present invention is not limited to the above embodiments and may be modified in various ways within the scope of the invention.

For example, the dielectric ceramic composition obtained by the method of manufacture according to the present invention may not only be used for a multilayer ceramic capacitor, but also used for other electronic devices formed with a dielectric layer.

Below, the present invention will be explained based on further detailed examples, but the present invention is not limited to the examples.

EXAMPLE 1

Samples of multilayer ceramic capacitors were produced by the procedure described below.

First, the following pastes were prepared.

Dielectric Layer Paste

First, ingredients of the main component and ingredients of the subcomponents having a grain diameter of 0.1 to 1 $\mu$m were prepared. Carbonates were used for the ingredients of MgO and MnO, and oxides were used for other ingredients. Also, $(Ba_{0.5} Ca_{0.4}) SiO_3$ was used for an ingredient of a second subcomponent. Note that $(Ba_{0.5} Ca_{0.4}) SiO_3$ was produced by performing wet mixing by a ball-mill on $BaCO_3$, $CaCO_3$ and $SiO_2$ for 16 hours, drying the result, then firing at 1150° C. in the air and further performing wet pulverizing by a ball-mill for 100 hours.

At first, pre-calcination powder was prepared by mixing $BaTiO_3$ as the main component and $MgCO_3$ as a first subcomponent and drying the result. As shown in Table 1, the pre-calcination powder contained 0.9 mole of $MgCO_3$ with respect to 100 moles of $Ba_mTiO_{2+m}$, furthermore, when investigating the molar ratio of a specific component $(Ba+Mg+Ca+Sr)/(Ti+Yb+Y)$ in the pre-calcination powder, it was 1.009 as shown in Table 1. While when investigating the molar ratio of $(Ba+Yb+Y)/(Ti+Mg+Ca+Sr)$, it was 0.991 as shown in Table 1.

Next, the pre-calcination powder was calcined.

The calcination conditions were as follows:

Rate of temperature rise: 300° C./hour

Holding temperature (T1 in Table 2): 1000° C.

Temperature holding time: 2 hours

Atmosphere: in the air

The material obtained by this calcination was pulverized by an alumina-roll to obtain a calcined powder, then, as shown in Table 2, 3.0 moles of $(Ba_{0.6}Ca_{0.4})SiO_3$ (described as BCG in the table), 0.374 mole of $MnCO_3$, 0.1 mole of $V_2O_5$, 2.1 moles of $Yb_2O_3$, and 2.0 moles of $Y_2O_3$ were added to the calcined powder, the result was wet-mixed for 16 hours by a ball mill, then dried to obtain a powder of a dielectric ceramic composition of the final composition.

100 parts by weight of the powder of the dielectric ceramic composition obtained in this way, 4.8 parts by weight of acrylic resin, 40 parts by weight of methylene chloride, 20 parts by weight of ethyl acetate, 6 parts by weight of mineral spirits, and 4 parts by weight of acetone were mixed using a ball mill to make a paste.

Internal Electrode Layer Paste 100 parts by weight of Ni particles of an average grain diameter of 0.2 to 0.8 $\mu$m, 40 parts by weight of an organic vehicle (8 parts by weight of ethyl cellulose were dissolved in 92 parts by weight of butyl carbitol) and 10 parts by weight of butyl carbitol were kneaded by using a triple-roll to make a paste.

External Electrode Paste 100 parts by weight of Cu particles of an average grain diameter of 0.5 $\mu$m, 35 parts by weight of an organic vehicle (8 parts by weight of an ethyl cellulose resin dissolved in 92 parts by weight of butyl carbitol), and 7 parts by weight of butyl carbitol were kneaded together to make a paste.

Preparation of Green Chip The above dielectric layer paste was used to form a green sheet of a thickness of 15 $\mu$m on a PET film. The internal electrode paste was printed on the surface of the green sheet, then the sheet was peeled from the PET film of a thickness of 15 $\mu$m and the sheet was removed from the PET film. Next, four layers of the green sheets printed with the internal electrode paste were stacked over a plurality of protective green sheets (those without the internal electrode layer paste printed on it) and pressed to obtain a green chip.

Firing

First, the green chip was cut to a predetermined size, then processed to remove the binder, fired, and annealed under the following conditions, then formed with external electrodes to obtain samples of the multilayer ceramic capacitors of the configuration shown in FIG. 1.

Conditions for Processing to Remove Binder

Rate of temperature rise: 15° C./hour

Holding temperature: 280° C.

Temperature holding time: 8 hours

Atmosphere: in the air

Firing Conditions

Rate of temperature rise: 200° C./hour

Holding temperature (T2 in Table 2): a temperature shown in Table 2

Temperature holding time: 2 hours

Cooling rate: 300° C./hour

Atmospheric gas: wet $N_2+H_2$ mixed gas

Oxygen partial pressure: $10^{-11}$ atmospheres

Annealing Conditions

Holding temperature: 900° C.

Temperature holding time: 9 hours

Cooling rate: 300° C./hour

Atmospheric gas: wet $N_2$ gas

Oxygen partial pressure: $4\times10^{-7}$ atmospheres

Note that for the wetting of the atmospheric gas at the time of the firing and annealing, a wetter with a water temperature of 35° C. was used.

External Electrodes

The external electrodes were formed by polishing the end faces of the fired body by sandblasting, then transferring the above external electrode paste to the end faces and firing them there in a wet $N_2+H_2$ atmosphere at 800° C. for 10 minutes.

The thus obtained samples had a size of 3.2 mm×1.6 mm×0.6 mm, four dielectric layers were sandwiched between internal electrode layers, and the dielectric layer had a thickness of 10 μm. The thickness of each internal electrode layer was 1.5 μm.

Disk-shaped samples were also prepared in addition to the samples of the capacitors. These disk-shaped samples were of the same compositions of the dielectric layer of the above capacitors and were fired under the same conditions. In—Ga electrodes of diameters of 5 mm were coated on the two surfaces of the samples.

The samples were evaluated as to the following characteristics.

Specific Permittivity ($\in_r$), Dielectric Loss (tanD)

A capacitance and tanD of the disk-shaped samples were measured at 25° C. by an LCR meter under conditions of 1 kHz and 1 Vrms. Further, the specific permittivity was calculated from the capacitance, electrode dimensions, and thickness of the samples. The results are shown in Table 3. The higher the specific permittivity the better. The lower the dielectric loss the better.

Insulation Resistance (ρ)

A specific insulation of samples of the multilayer chip capacitors was measured at 25° C. The measurement of the specific resistance was conducted by using an insulation resistance tester (R8340A (50V-1 minute value) made by Advantest Corporation). The results are shown in table 3. Note that the CR product in table 3 is a product of a permittivity and insulation resistance. The higher the insulation resistance the better.

Breakdown Voltage (VB)

The breakdown voltage was found by applying a DC voltage to the samples of the multilayer chip capacitors having four layers at a speed of temperature rise of 100V/sec. and measuring the voltage at the time that a leakage current of 100 mA was observed. The results are shown in Table 3. The higher the breakdown voltage, the better.

IR Lifetime under DC Electric Field (High Temperature Accelerated Lifetime)

The samples of multilayer chip capacitors were subjected to acceleration tests at 200° C. under an electric field of 15 V/μm. The time until the insulation resistance fell below 1MΩ was made as the lifetime. The results are shown in Table 3. The longer the lifetime, the better the durability of the capacitor.

Temperature Characteristic of Capacitance

Figure 4:
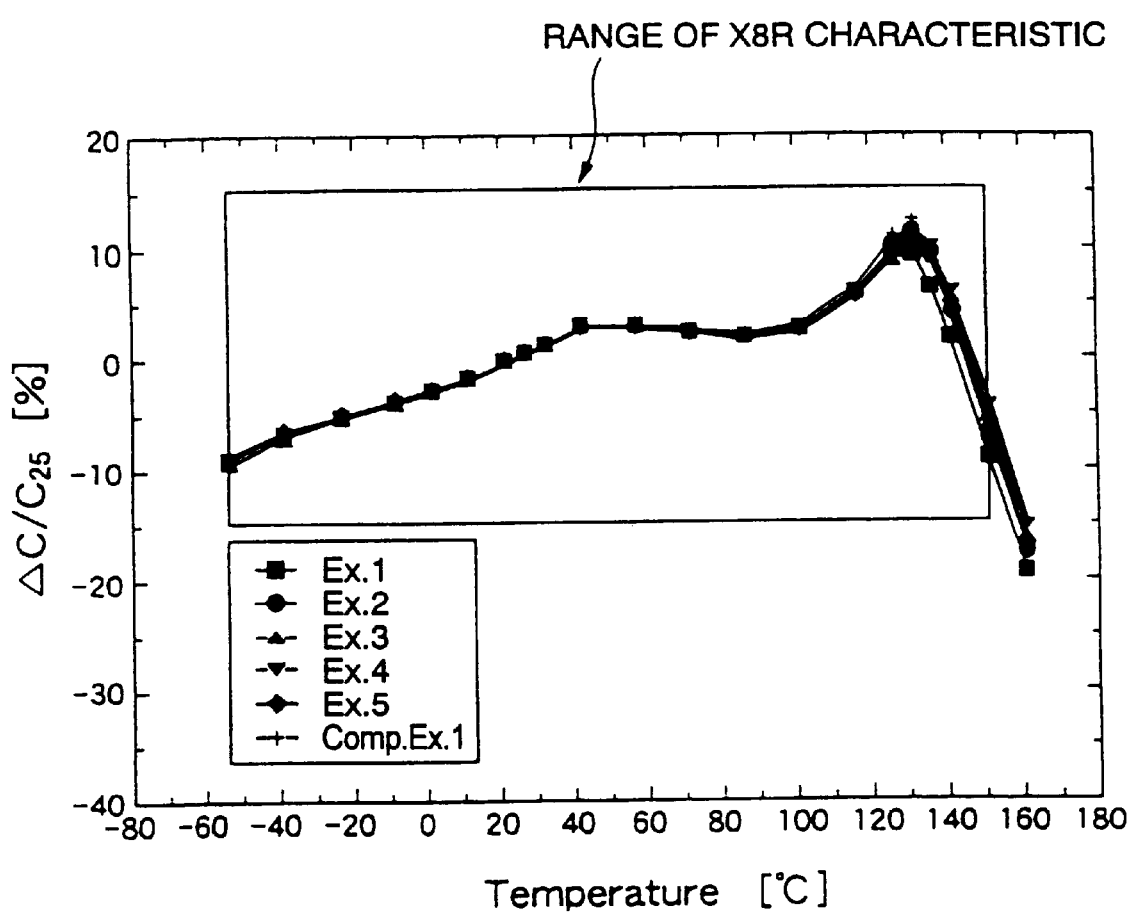
FIG. 4 is a graph of a capacitance-temperature characteristic of dielectric ceramic compositions obtained by examples of the present invention.

The capacitance of samples of multilayer chip capacitors was measured in a temperature range of −55 to +160° C. to investigate if the X8R characteristic was satisfied. Note that the characteristic was measured by using an LCR meter at a measurement voltage of 1V. The results are shown in FIG. 4.

TABLE 1

|  |  | Composition at calcination | | | | | | | Mole Ratio (Ba + Mg + Ca + Sr)/ (Ti + Yb + Y) | Mole Ratio (Ba + Yh + Y)/ (Ti + Mg + Ca + Sr) |
| --- | --- | --- | --- | --- | --- | --- | --- | --- | --- | --- |
|  |  | BT | MgCO$_3$ | MnCO$_3$ | BCG | V$_2$O$_5$ | Yb$_2$O$_3$ | Y$_2$O$_3$ |  |  |
| Ex. 1 | BT + Mg | 100 | 0.9 | 0.000 | 0.0 | 0.0 | 0.0 | 0.0 | 1.009 | 0.991 |
| Ex.2 | BT + Mg + Y | 100 | 0.9 | 0.000 | 0.0 | 0.0 | 0.0 | 0.5 | 0.999 | 1.001 |
| Ex. 3 | BT + Mg + Yb | 100 | 0.9 | 0.000 | 0.0 | 0.0 | 0.5 | 0.0 | 0.999 | 1.101 |
| Ex. 4 | BT + Mg + Yb + Y | 100 | 0.9 | 0.000 | 0.0 | 0.0 | 0.5 | 0.5 | 0.989 | 1.011 |
| Ex. 5 | BT + Mg + Yb + Y + Mn + V | 100 | 0.9 | 0.374 | 0.0 | 0.1 | 0.5 | 0.5 | 0.989 | 1.011 |
| Comp. Ex. 1 | No Calcination | 0 | 0.0 | 0.000 | 0.0 | 0.0 | 0.0 | 0.0 | 1.000 | 1.000 |
| Ex. 6 | BT + Mg | 100 | 0.9 | 0.000 | 0.0 | 0.0 | 0.0 | 0.0 | 1.009 | 0.991 |
| Ex. 7 | BT + Mg + Y | 100 | 0.9 | 0.000 | 0.0 | 0.0 | 0.0 | 0.5 | 0.999 | 1.001 |
| Ex. 8 | BT + Mg + Yb | 100 | 0.9 | 0.000 | 0.0 | 0.0 | 0.5 | 0.0 | 0.999 | 1.001 |
| Ex. 9 | BT + Mg + Yb + Y | 100 | 0.9 | 0.000 | 0.0 | 0.0 | 0.5 | 0.5 | 0.989 | 1.001 |
| Ex. 10 | BT + Mg + Yb + Y + Mn + V | t00 | 0.9 | 0.374 | 0.0 | 0.1 | 0.5 | 0.5 | 0.989 | 1.001 |
| Comp. Ex. 2 | No Calcination | 0 | 0.0 | 0.000 | 0.0 | 0.0 | 0.0 | 0.0 | 1.000 | 1.000 |
| Ex. 11 | BT + Mg + Y | 1100 | 0.9 | 0.000 | 0.0 | 0.0 | 0.0 | 1.0 | 0.989 | 1.011 |
| Ex. 12 | BT + Mg + Yb | 100 | 0.9 | 0.000 | 0.0 | 0.0 | 1.0 | 0.0 | 0.989 | 1.011 |
| Ex. 13 | BT + Mg + Yb + Y | 100 | 0.9 | 0.000 | 0.0 | 0.0 | 1.0 | 1.0 | 0.970 | 1.031 |
| Ex. 14 | BT + Mg + Yb + Y + M)) + V | 100 | 0.9 | 0.374 | 0.0 | 0.1 | 1.0 | 1.0 | 0.970 | 1.031 |
| Ex. 15 | BT + Mg + Y | 100 | 0.9 | 0.000 | 0.0 | 0.0 | 0.0 | 2.0 | 0.970 | 1.031 |
| Ex. 16 | BT + Mg + Yb | 100 | 0.9 | 0.000 | 0.0 | 0.0 | 2.1 | 0.0 | 0.968 | 1.033 |
| Ex. 17 | BT + Mg + Yb + Y | 100 | 0.9 | 0.000 | 0.0 | 0.0 | 2.1 | 2.0 | 0.932 | 1.073 |
| Ex. 18 | BT + Mg + Yb + Y + Mn + V | 100 | 0.9 | 0.374 | 0.0 | 0.1 | 2.1 | 2.0 | 0.932 | 1.073 |
| Ref. Ex. 1 | BT + Mg + Yb + Y + Mn + V | 100 | 0.9 | 0.374 | 0.0 | 0.1 | 2.1 | 2.0 | 0.932 | 1.073 |
| Ex. 19 | BT + Mg + Yb + Y + Mn + V | 100 | 0.9 | 0.374 | 0.0 | 0.1 | 2.1 | 2.0 | 0.932 | 1.073 |
| Ex. 20 | BT + Mg + Yb + Y + Mn + V | 100 | 0.9 | 0.374 | 0.0 | 0.1 | 2.1 | 2.0 | 0.932 | 1.073 |
| Ex. 21 | BT + Mg + Yb + Y + Mn + V | 100 | 0.9 | 0.374 | 0.0 | 0.1 | 2.1 | 2.0 | 0.932 | 1.073 |
| Ex. 22 | BT + Mg + Yb + Y + Mn + V | 100 | 0.9 | 0.374 | 0.0 | 0.1 | 2.1 | 2.0 | 0.932 | 1.073 |
| Ref. Ex. 2 | BT + Mg + Yb + Y + Mn + V | 100 | 0.9 | 0.374 | 0.0 | 0.1 | 2.1 | 2.0 | 0.932 | 1.073 |
| Ref. Ex. 3 | BT + Mg + Yb + Y + Mn + V | 100 | 3.5 | 0.374 | 0.0 | 0.1 | 1.0 | 0.0 | 1.015 | 0.986 |
| Ref. Ex. 4 | BT + Mg + Yb + Y + Mn + V | 100 | 3.0 | 0.374 | 0.0 | 0.1 | 0.5 | 0.0 | 1.020 | 0.981 |
| Ref. Ex. 5 | BT + Mg + Yb + Y + M)) + V | 100 | 3.0 | 0.374 | 0.0 | 0.1 | 0.5 | 0.5 | 1.010 | 0.990 |

TABLE 2

| | T1 | BT | MgCO₃ | MnCO₃ | BCG | V₂O₅ | Yb₂O₃ | Y₂O₃ | T2 |
|---|---|---|---|---|---|---|---|---|---|
| Ex. 1 | 1000 | 0 | 0.0 | 0.374 | 3.0 | 0.1 | 2.1 | 2.0 | 1320 |
| Ex. 2 | | 0 | 0.0 | 0.374 | 3.0 | 0.1 | 2.1 | 1.5 | |
| Ex. 3 | | 0 | 0.0 | 0.374 | 3.0 | 0.1 | 1.6 | 2.0 | |
| Ex. 4 | | 0 | 0.0 | 0.374 | 3.0 | 0.1 | 1.6 | 1.5 | |
| Ex. 5 | | 0 | 0.0 | 0.000 | 3.0 | 0.0 | 1.6 | 1.5 | |
| Comp. Ex. 1 | | 100 | 1.0 | 0.374 | 3.0 | 0.1 | 2.1 | 2.0 | |
| Ex. 6 | 1000 | 0 | 0.0 | 0.374 | 3.0 | 0.1 | 2.1 | 2.0 | 1340 |
| Ex. 7 | | 0 | 0.0 | 0.374 | 3.0 | 0.1 | 2.1 | 1.5 | |
| Ex. 8 | | 0 | 0.0 | 0.374 | 3.0 | 0.1 | 1.6 | 2.0 | |
| Ex. 9 | | 0 | 0.0 | 0.374 | 3.0 | 0.1 | 1.6 | 1.5 | |
| Ex. 10 | | 0 | 0.0 | 0.000 | 3.0 | 0.0 | 1.6 | 1.5 | |
| Comp. Ex. 2 | | 100 | 1.0 | 0.374 | 0.0 | 1.1 | 1.1 | 1.0 | 1320 |
| Ex. 12 | | 0 | 0.0 | 0.374 | 3.0 | 0.1 | 1.1 | 2.0 | |
| Ex. 13 | | 0 | 0.0 | 0.374 | 3.0 | 0.1 | 1.1 | 1.0 | |
| Ex. 14 | | 0 | 0.0 | 0.000 | 3.0 | 0.0 | 1.1 | 1.0 | |
| Ex. 15 | 1000 | 0 | 0.0 | 0.374 | 3.0 | 0.1 | 2.1 | 0.0 | 1320 |
| Ex. 16 | | 0 | 0.0 | 0.374 | 3.0 | 0.1 | 0.0 | 2.0 | |
| Ex. 17 | | 0 | 0.0 | 0.374 | 3.0 | 0.1 | 0.0 | 0.0 | |
| Ex. 18 | | 0 | 0.0 | 0.000 | 3.0 | 0.0 | 0.0 | 0.0 | |
| Ref. Ex. 1 | 600 | 0 | 0.0 | 0.000 | 3.0 | 0.0 | 0.0 | 0.0 | 1320 |
| Ex. 19 | 700 | 0 | 0.0 | 0.000 | 3.0 | 0.0 | 0.0 | 0.0 | |
| Ex. 20 | 800 | 0 | 0.0 | 0.000 | 3.0 | 0.0 | 0.0 | 0.0 | |
| Ex. 21 | 900 | 0 | 0.0 | 0.000 | 3.0 | 0.0 | 0.0 | 0.0 | |
| Ex. 22 | 1100 | 0 | 0.0 | 0.000 | 3.0 | 0.0 | 0.0 | 0.0 | |
| Ref. Ex. 2 | 1200 | 0 | 0.0 | 0.000 | 3.0 | 0.0 | 0.0 | 0.0 | |
| Ref. Ex. 3 | 1000 | 0 | 0.0 | 0.000 | 3.0 | 0.0 | 0.0 | 0.0 | 1280 |
| Ref. Ex. 4 | 1000 | 0 | 0.0 | 0.000 | 3.0 | 0.0 | 0.0 | 0.0 | 1320 |
| Ref. Ex. 5 | 1000 | 0 | 0.0 | 0.000 | 3.0 | 0.0 | 0.0 | 0.0 | 1320 |

Composition of components additionally added at time of coating

TABLE 3

| | $\epsilon r$ (1 kHz) [ ] | tan D (1 kHz) [%] | $\rho$ [$\Omega \cdot$ cm] | CR Product [M$\Omega$ $\mu$F] | VB [V] | IR Lifetime 200° C.- 15 V/$\mu$m |
|---|---|---|---|---|---|---|
| Ex. 1 | 1859 | 0.52 | 3.3E+12 | 550 | 1082 | 18.5 |
| Ex. 2 | 1994 | 0.48 | 4.2E+12 | 737 | 1221 | 66.6 |
| Ex. 3 | 1953 | 0.57 | 2.4E+12 | 416 | 993 | 55.3 |
| Ex. 4 | 1919 | 0.50 | 3.4E+12 | 570 | 1215 | 97.0 |
| Ex. 5 | 2022 | 0.50 | 3.6E+12 | 653 | 858 | 107.2 |
| Comp. Ex. 1 | 1944 | 0.48 | 3.4E+12 | 583 | 797 | 53.1 |
| Ex. 6 | 1753 | 0.47 | 3.6E+12 | 598 | 861 | 30.0 |
| Ex. 7 | 2068 | 0.48 | 4.7E+12 | 867 | 768 | 45.2 |
| Ex. 8 | 1956 | 0.46 | 3.3E+12 | 569 | 807 | 38.7 |
| Ex. 9 | 1954 | 0.54 | 4.2E+12 | 724 | 820 | 73.6 |
| Ex. 10 | 2029 | 0.50 | 5.2E+12 | 938 | 774 | 68.4 |
| Comp. Ex. 2 | 2062 | 0.49 | 5.0E+12 | 916 | 615 | 34.8 |
| Ex. 11 | 2051 | 0.50 | 5.2E+12 | 944 | 1201 | 65.0 |
| Ex. 12 | 1944 | 0.51 | 3.4E+12 | 585 | 1005 | 63.4 |
| Ex. 13 | 1922 | 0.50 | 3.6E+12 | 612 | 1215 | 123.0 |
| Ex. 14 | 2061 | 0.49 | 5.2E+12 | 948 | 1205 | 122.4 |
| Ex. 15 | 2071 | 0.50 | 5.2E+12 | 953 | 1309 | 78.8 |
| Ex. 16 | 1956 | 0.51 | 2.3E+12 | 398 | 1008 | 66.3 |
| Ex. 17 | 1943 | 0.51 | 3.6E+12 | 619 | 1221 | 158.3 |
| Ex. 18 | 2080 | 0.40 | 5.1E+12 | 939 | 1229 | 168.3 |
| Ref. Ex. 1 | 1998 | 0.52 | 5.1E+12 | 902 | 799 | 58.9 |
| Ex. 19 | 2009 | 0.50 | 5.1E+12 | 907 | 1101 | 122.2 |
| Ex. 20 | 2007 | 0.40 | 5.1E+12 | 906 | 1206 | 155.4 |
| Ex. 21 | 2020 | 0.41 | 5.1E+12 | 912 | 1212 | 171.6 |
| Ex. 22 | 2098 | 0.55 | 6.2E+12 | 1151 | 929 | 62.2 |
| Ref. Ex. 2 | 2201 | 0.61 | 6.0E+12 | 1169 | 869 | 21.2 |
| Ref. Ex. 3 | 2073 | 0.76 | 2.1E+13 | 3853 | 950 | 4.3 |
| Ref. Ex. 4 | 2218 | 0.50 | 1.8E+13 | 3533 | 1012 | 10.1 |
| Ref. Ex. 5 | 2068 | 0.52 | 2.1E+13 | 3843 | 1182 | 20.5 |

EXAMPLE 2

Pre-calcination powder was prepared by mixing BaTiO₃ as a main component, MgCO₃ as an ingredient of a first subcomponent and Y₂O₃ as a fifth subcomponent and drying them. As shown in Table 1, the pre-calcination powder contained 0.9 mole of MgCO₃ and 0.5 mole of Y₂O₃ with respect to 100 moles of BaTiO₃. When investigating the molar ratio of a specific component (Ba+Mg+Ca+Sr)/(Ti+Yb+Y) in the pre-calcination powder, it was 0.999 as shown in Table 1. The molar ratio of (Ba+Yb+Y)/(Ti+Mg+Ca+Sr) was found to be 1.001 as shown in Table 1.

Next, the pre-calcination powder was calcined to prepare cylinder-shaped samples and samples of capacitors in the same way as in the example 1 except that the calcined powder was added 3.0 moles of $(Ba_{0.6}Ca_{0.4})SiO_3$, 0.374 mole of $MnCO_3$, 0.1 mole of $V_2O_5$, 2.1 moles of $Yb_2O_3$ and 1.5 moles of $Y_2O_3$ as shown in Table 2, and the same tests as in the example 1 were conducted. The results are shown in Table 3 and FIG. 4.

EXAMPLE 3

Pre-calcination powder was prepared by mixing $BaTiO_3$ as a main component, $MgCO_3$ as an ingredient of a first subcomponent and $Yb_2O_3$ as a fourth subcomponent and drying them. As shown in Table 1, the pre-calcination powder contained 0.9 mole of $MgCO_3$ and 0.5 mole of $Yb_2O_3$ with respect to 100 moles of $BaTiO_3$. When investigating the molar ratio of a specific component (Ba+Mg+Ca+Sr)/(Ti+Yb+Y) in the pre-calcination powder, it was 0.999 as shown in Table 1. The molar ratio of (Ba+Yb+Y)/(Ti+Mg+Ca+Sr) was found to be 1.001 as shown in Table 1.

Next, the pre-calcination powder was calcined to prepare cylinder-shaped samples and samples of capacitors in the same way as in the example 1 except that the calcined powder was added 3.0 moles of $(Ba_{0.6}Ca_{0.4})SiO_3$, 0.374 mole of $MnCO_3$, 0.1 mole of $V_2O_5$, 1.6 moles of $Yb_2O_3$ and 2.0 moles of $Y_2O_3$ as shown in Table 2, and the same tests as in the example 1 were conducted. The results are shown in Table 3 and FIG. 4.

EXAMPLE 4

Pre-calcination powder was prepared by mixing $BaTiO_3$ as a main component, $MgCO_3$ as an ingredient of a first subcomponent, $Yb_2O_3$ as a fourth subcomponent and $Y_2O_3$ as a fifth subcomponent and drying them. As shown in Table 1, the pre-calcination powder contained 0.9 mole of $MgCO_3$, 0.5 mole of $Yb_2O_3$ and 0.5 mole of $Y_2O_3$ with respect to 100 moles of $BaTiO_3$. When investigating the molar ratio of a specific component (Ba+Mg+Ca+Sr)/(Ti+Yb+Y) in the pre-calcination powder, it was 0.989 as shown in Table 1. The molar ratio of (Ba+Yb+Y)/(Ti+Mg+Ca+Sr) was found to be 1.011 as shown in Table 1.

Next, the pre-calcination powder was calcined to prepare cylinder-shaped samples and samples of capacitors in the same way as in the example 1 except that the calcined powder was added 3.0 moles of $(Ba_{0.6}Ca_{0.4})SiO_3$, 0.374 mole of $MnCO_3$, 0.1 mole of $V_2O_5$, 1.6 moles of $Yb_2O_3$ and 1.5 moles of $Y_2O_3$ as shown in Table 2, and the same tests as in the example 1 were conducted. The results are shown in Table 3 and FIG. 4.

EXAMPLE 5

Pre-calcination powder was prepared by mixing BaTiO3 as a main component, $MgCO_3$ as an ingredient of a first subcomponent, $V_2O_5$ as a third subcomponent, $Yb_2O_3$ as a fourth subcomponent, $Y_2O_3$ as a fifth subcomponent and $MnCO_3$ as an ingredient of another subcomponent and drying them. As shown in Table 1, the pre-calcination powder contained 0.9 mole of $MgCO_3$, 0.37 mole of $MnCO_3$, 0.1 mole of $V_2O_5$, and 0.5 mole of $Yb_2O_3$ and 0.5 mole of $Y_{2\ 3}$ with respect to 100 moles of $BaTiO_3$. When investigating the molar ratio of a specific component (Ba+Mg+Ca+Sr)/(Ti+Yb+Y) in the pre-calcination powder, it was 0.989 as shown in Table 1. The molar ratio of (Ba+Yb+Y)/(Ti+Mg+Ca+Sr) was found to be 1.011 as shown in Table 1.

Next, the pre-calcination powder was calcined to prepare cylinder-shaped samples and samples of capacitors in the same way as in the example 1 except that the calcined powder was added 3.0 moles of $(Ba_{0.6}Ca_{0.4})SiO_3$, 1.6 moles of $Yb_2O_3$ and 1.5 moles of $Y_2O_3$ as shown in Table 2, and the same tests as in the example 1 were conducted. The results are shown in Table 3 and FIG. 4.

Comparative Example 1

As shown in Table 1 and Table 2, cylinder-shaped samples and samples of capacitors were prepared in the same way as in the example 1 except that calcination was not performed, 0.9 mole of $MgCO_3$, 0.374 mole of $MnCO_3$, 3.0 moles of $(Ba_{0.6}Ca_{0.4})SiO_3$, 0.1 mole of $V_2O_5$, 2.1 moles of $Yb_2O_3$ and 2.0 moles of $Y_2O_3$ were added to 100 moles of $BaTiO_3$ as a main component and the obtained mixed powder was subjected to firing. The same tests as in the example 1 were conducted. The results are shown in Table 3 and FIG. 4. Note that when investigating the molar ratio of a specific component (Ba+Mg+Ca+Sr)/(Ti+Yb+Y) in the pre-calcination powder, it was 1.000 as shown in Table 1. The molar ratio of (Ba+Yb+Y)/(Ti+Mg+Ca+Sr) was found to be 1.000 as shown in Table 1.

EXAMPLES 6 to 10

Cylinder-shaped samples and samples of capacitors were prepared in the same way as in the examples 1 to 5 except that the firing temperature (T2) was set to be 1340° C., and the same tests as in the examples 1 to 5 were conducted. The results are shown in Table 3.

Comparative Example 2

Cylinder-shaped samples and samples of capacitors were prepared in the same way as in the comparative example 1 except that the firing temperature (T2) was set to be 1340° C., and the same tests as in the comparative example 1 were conducted. The results are shown in Table 3.

EXAMPLE 11

Pre-calcination powder was prepared by mixing $BaTiO_3$ as a main component, $MgCO_3$ as an ingredient of a first subcomponent and $Y_2O_3$ as a fifth subcomponent and drying them. As shown in Table 1, the pre-calcination powder contained 0.9 mole of $MgCO_3$ and 1.0 mole of Y20 with respect to 100 moles of $BaTiO_3$. When investigating the molar ratio of a specific component (Ba+Mg+Ca+Sr)/(Ti+Yb+Y) in the pre-calcination powder, it was 0.989 as shown in Table 1. The molar ratio of (Ba+Yb+Y)/(Ti+Mg+Ca+Sr) was found to be 1.011 as shown in Table 1.

Next, the pre-calcination powder was calcined to prepare cylinder-shaped samples and samples of capacitors in the same way as in the example 1 except that the calcined powder was added 3.0 moles of $(Ba_{0.6}Ca_{0.4})SiO_3$, 0.374 mole of $MnCO_3$, 0.1 mole of $V_2O_{51}$ 2.1 moles of $Yb_2O_3$ and 1.0 mole of $Y_2O_3$ as shown in Table 2, and the same tests as in the example 1 were conducted. The results are shown in Table 3.

EXAMPLE 12

Pre-calcination powder was prepared by mixing $BaTiO_3$ as a main component, $MgCO_3$ as an ingredient of a first subcomponent and $Yb_2O_3$ as a fourth subcomponent and drying them. As shown in Table 1, the pre-calcination powder contained 0.9 mole of $MgCO_3$ and 1.0 mole of $Yb_2O_3$ with respect to 100 moles of $BaTiO_3$. When investigating the molar ratio of a specific component (Ba+Mg+

Ca+Sr)/(Ti+Yb+Y) in the pre-calcination powder, it was 0.989 as shown in Table 1. The molar ratio of (Ba+Yb+Y)/(Ti+Mg+Ca+Sr) was found to be 1.011 as shown in Table 1.

Next, the pre-calcination powder was calcined to prepare cylinder-shaped samples and samples of capacitors in the same way as in the example 1 except that the calcined powder was added 3.0 moles of $(Ba_{0.6}Ca_{0.4})SiO_3$, 0.374 mole of $MnCO_3$, 0.1 mole of $V_2O_5$, 1.1 moles of $Yb_2O_3$ and 2.0 mole of $Y_2O_3$ as shown in Table 2, and the same tests as in the example 1 were conducted. The results are shown in Table 3.

EXAMPLE 13

Pre-calcination powder was prepared by mixing $BaTiO_3$ as a main component, $MgCO_3$ as an ingredient of a first subcomponent, $Yb_2O_3$ as a fourth subcomponent and $Y_2O_3$ as a fifth subcomponent and drying them. As shown in Table 1, the pre-calcination powder contained 0.9 mole of $MgCO_3$, 1.0 mole of $Yb_2O_3$ and 1.0 mole of $Y_2O_3$ with respect to 100 moles of $BaTiO_3$. When investigating the molar ratio of a specific component (Ba+Mg+Ca+Sr)/(Ti+Yb+Y) in the pre-calcination powder, it was 0.970 as shown in Table 1. The molar ratio of (Ba+Yb+Y)/(Ti+Mg+Ca+Sr) was found to be 1.031 as shown in Table 1.

Next, the pre-calcination powder was calcined to prepare cylinder-shaped samples and samples of capacitors in the same way as in the example 1 except that the calcined powder was added 3.0 moles of $(Ba_{0.6}Ca_{0.4})SiO_3$, 0.374 mole of $MnCO_3$, 0.1 mole of $V_2O_5$, 1.1 moles of $Yb_2O_3$ and 1.0 mole of $Y_2O_3$ as shown in Table 2, and the same tests as in the example 1 were conducted. The results are shown in Table 3.

EXAMPLE 14

Pre-calcination powder was prepared by mixing $BaTiO_3$ as a main component, $MgCO_3$ as an ingredient of a first subcomponent, $V_2O_5$ as a third subcomponent, $Yb_2O_3$ as a fourth subcomponent, $Y_2O_3$ as a fifth subcomponent and $MnCO_3$ as an ingredient of another subcomponent and drying them. As shown in Table 1, the pre-calcination powder contained 0.9 mole of $MgCO_3$, 0.37 mole of $MnCO_3$, 0.1 mole of $V_2O_5$, 1.0 mole of $Yb_2O_3$ and 1.0 mole of $Y_2O_3$ with respect to 100 moles of $BaTiO_3$. When investigating the molar ratio of a specific component (Ba+Mg+Ca+Sr)/(Ti+Yb+Y) in the pre-calcination powder, it was 0.970 as shown in Table 1. The molar ratio of (Ba+Yb+Y)/(Ti+Mg+Ca+Sr) was found to be 1.031 as shown in Table 1.

Next, the pre-calcination powder was calcined to prepare cylinder-shaped samples and samples of capacitors in the same way as in the example 1 except that the calcined powder was added 3.0 moles of $(Ba_{0.6}Ca_{0.4})SiO_3$, 1.1 moles of $Yb_2O_3$ and 1.0 mole of $Y_2O_3$ as shown in Table 2, and the same tests as in the example 1 were conducted. The results are shown in Table 3.

EXAMPLE 15

Pre-calcination powder was prepared by mixing $BaTiO_3$ as a main component, $MgCO_3$ as an ingredient of a first subcomponent and $Y_2O_3$ as a fifth subcomponent and drying them. As shown in Table 1, the pre-calcination powder contained 0.9 mole of $MgCO_3$ and 2.0 moles of $Y_2O_3$ with respect to 100 moles of $BaTiO_3$. When investigating the molar ratio of a specific component (Ba+Mg+Ca+Sr)/(Ti+Yb+Y) in the pre-calcination powder, it was 0.970 as shown in Table 1. The molar ratio of (Ba+Yb+Y)/(Ti+Mg+Ca+Sr) was found to be 1.031 as shown in Table 1.

Next, the pre-calcination powder was calcined to prepare cylinder-shaped samples and samples of capacitors in the same way as in the example 1 except that the calcined powder was added 3.0 moles of $(Ba_{0.6}Ca_{0.4})SiO_3$, 0.374 mole of $MnCO_3$, 0.1 mole of $V_2O_5$ and 2.1 moles of $Yb_2O_3$ as shown in Table 2, and the same tests as in the example 1 were conducted. The results are shown in Table 3.

EXAMPLE 16

Pre-calcination powder was prepared by mixing $BaTiO_3$ as a main component, $MgCO_3$ as an ingredient of a first subcomponent and $Yb_2O_3$ as a fourth subcomponent and drying them. As shown in Table 1, the pre-calcination powder contained 0.9 mole of $MgCO_3$ and 2.1 moles of $Yb_2O$ with respect to 100 moles of $BaTiO_3$. When investigating the molar ratio of a specific component (Ba+Mg+Ca+Sr)/(Ti+Yb+Y) in the pre-calcination powder, it was 0.968 as shown in Table 1. The molar ratio of (Ba+Yb+Y)/(Ti+Mg+Ca+Sr) was found to be 1.033 as shown in Table 1.

Next, the pre-calcination powder was calcined to prepare cylinder-shaped samples and samples of capacitors in the same way as in the example 1 except that the calcined powder was added 3.0 moles of $(Ba_{0.6}Ca_{0.4})SiO_3$, 0.374 mole of $MnCO_3$, 0.1 mole of $V_2O_5$ and 2.0 moles of $Y_2O_3$ as shown in Table 2, and the same tests as in the example 1 were conducted. The results are shown in Table 3.

EXAMPLE 17

Pre-calcination powder was prepared by mixing $BaTiO_3$ as a main component, $MgCO_3$ as an ingredient of a first subcomponent, $Yb_2O_3$ as a fourth subcomponent and $Y_2O_3$ as a fifth subcomponent and drying them. As shown in Table 1, the pre-calcination powder contained 0.9 mole of $MgCO_3$, 2.1 moles of $Yb_2O_3$ and 2.0 moles of $Y_2O_3$ with respect to 100 moles of $BaTiO_3$. When investigating the molar ratio of a specific component (Ba+Mg+Ca+Sr)/(Ti+Yb+Y) in the pre-calcination powder, it was 0.932 as shown in Table 1. The molar ratio of (Ba+Yb+Y)/(Ti+Mg+Ca+Sr) was found to be 1.073 as shown in Table 1.

Next, the pre-calcination powder was calcined to prepare cylinder-shaped samples and samples of capacitors in the same way as in the example 1 except that the calcined powder was added 3.0 moles of $(Ba_{0.6}Ca_{0.4})SiO_3$, 0.374 mole of $MnCO_3$ and 0.1 mole of $V_2O_5$ as shown in Table 2, and the same tests as in the example 1 were conducted. The results are shown in Table 3.

EXAMPLE 18

Pre-calcination powder was prepared by mixing $BaTiO_3$ as a main component, $MgCO_3$ as an ingredient of a first subcomponent, $V_2O_5$ as a third subcomponent, $Yb_2O_3$ as a fourth subcomponent, $Y_2O_3$ as a fifth subcomponent and $MnCO_3$ as an ingredient of another subcomponent and drying them. As shown in Table 1, the pre-calcination powder contained 0.9 mole of $MgCO_3$, 0.37 mole of $MnCO_3$, 0.1 mole of $V_2O_5$, 2.1 moles of $Yb_2O_3$ and 2.0 moles of $Y_2O_3$ with respect to 100 moles of $BaTiO_3$. When investigating the molar ratio of a specific component (Ba+Mg+Ca+Sr)/(Ti+Yb+Y) in the pre-calcination powder, it was 0.932 as shown in Table 1. The molar ratio of (Ba+Yb+Y)/(Ti+Mg+Ca+Sr) was found to be 1.073 as shown in Table 1.

Next, the pre-calcination powder was calcined to prepare cylinder-shaped samples and samples of capacitors in the same way as in the example 1 except that the calcined powder was added 3.0 moles of $(Ba_{0.6}Ca_{0.4})SiO_3$ as shown in Table 2, and the same tests as in the example 1 were conducted. The results are shown in Table 3.

Reference Example 1

Cylinder-shaped samples and samples of capacitors were prepared in the same way as in the example 18 except that the calcination temperature (T1) was set to be 600° C., and the same tests as in the example 1 were conducted. The results are shown in Table 3.

EXAMPLE 19

Cylinder-shaped samples and samples of capacitors were prepared in the same way as in the example 18 except that the calcination temperature (T1) was set to be 700° C., and the same tests as in the example 1 were conducted. The results are shown in Table 3.

EXAMPLE 20

Cylinder-shaped samples and samples of capacitors were prepared in the same way as in the example 18 except that the calcination temperature (T1) was set to be 800° C., and the same tests as in the example 1 were conducted. The results are shown in Table 3.

EXAMPLE 21

Cylinder-shaped samples and samples of capacitors were prepared in the same way as in the example 18 except that the calcination temperature (T1) was set to be 900° C., and the same tests as in the example 1 were conducted. The results are shown in Table 3.

EXAMPLE 22

Cylinder-shaped samples and samples of capacitors were prepared in the same way as in the example 18 except that the calcination temperature (T1) was set to be 1100° C., and the same tests as in the example 1 were conducted. The results are shown in Table 3.

Reference Example 2

Cylinder-shaped samples and samples of capacitors were prepared in the same way as in the example 18 except that the calcination temperature (T1) was set to be 1200° C., and the same tests as in the example 1 were conducted. The results are shown in Table 3.

Reference Example 3

Pre-calcination powder was prepared by mixing $BaTiO_3$ as a main component, $MgCO_3$ as an ingredient of a first subcomponent, $V_2O_5$ as a third subcomponent, $Yb_2O_3$ as a fourth subcomponent and $MnCO_3$ as an ingredient of another subcomponent and drying them. As shown in Table 1, the pre-calcination powder contained 3.5 moles of $MgCO_3$, 0.37 mole of $MnCO_3$, 0.1 mole of $V_2O_5$ and 1.0 mole of $Yb_2O_3$ with respect to 100 moles of $BaTiO_3$. When investigating the molar ratio of a specific component $(Ba+Mg+Ca+Sr)/(Ti+Yb+Y)$ in the pre-calcination powder, it was 1.015 as shown in Table 1. The molar ratio of $(Ba+Yb+Y)/(Ti+Mg+Ca+Sr)$ was found to be 0.986 as shown in Table 1.

Next, the pre-calcination powder was calcined to prepare cylinder-shaped samples and samples of capacitors in the same way as in the example 1 except that the calcined powder was added 3.0 moles of $(Ba_{0.6}Ca_{0.4})SiO_3$ as shown in Table 2 and that the result was subjected to firing at 1280° C., and the same tests as in the example 1 were conducted. The results are shown in Table 3.

Reference Example 4

Pre-calcination powder was prepared by mixing $BaTiO_3$ as a main component, $MgCO_3$ as an ingredient of a first subcomponent, $V_2O_5$ as a third subcomponent, $Yb_2O_3$ as a fourth subcomponent and $MnCO_3$ as an ingredient of another subcomponent and drying them.

As shown in Table 1, the pre-calcination powder contained 3.0 moles of $MgCO_3$, 0.37 mole of $MnCO_3$, 0.1 mole of $V_2O_5$ and 0.5 mole of $Yb_2O_3$ with respect to 100 moles of $BaTiO_3$. When investigating the molar ratio of a specific component $(Ba+Mg+Ca+Sr)/(Ti+Yb+Y)$ in the pre-calcination powder, it was 1.020 as shown in Table 1. The molar ratio of $(Ba+Yb+Y)/(Ti+Mg+Ca+Sr)$ was found to be 0.981 as shown in Table 1.

Next, the pre-calcination powder was calcined to prepare cylinder-shaped samples and samples of capacitors in the same way as in the example 1 except that the calcined powder was added 3.0 moles of $(Ba_{0.6}Ca_{0.4})SiO_3$ as shown in Table 2, and the same tests as in the example 1 were conducted. The results are shown in Table 3.

Reference Example 5

Pre-calcination powder was prepared by mixing $BaTiO_3$ as a main component, $MgCO_3$ as an ingredient of a first subcomponent, $V_2O_5$ as a third subcomponent, $Yb_2O_3$ as a fourth subcomponent, $Y_2O$ as a fifth subcomponent and $MnCO_3$ as an ingredient of another subcomponent and drying them. As shown in Table 1, the pre-calcination powder contained 3.0 moles of $MgCO_3$, 0.37 mole of $MnCO_3$, 0.1 mole of $V_2O_5$, 0.5 mole of $Yb_2O_3$ and 0.5 mole of $Y_2O_3$ with respect to 100 moles of $BaTiO_3$. When investigating the molar ratio of a specific component $(Ba+Mg+Ca+Sr)/(Ti+Yb+Y)$ in the pre-calcination powder, it was 1.010 as shown in Table 1. The molar ratio of $(Ba+Yb+Y)/(Ti+Mg+Ca+Sr)$ was found to be 0.990 as shown in Table 1.

Next, the pre-calcination powder was calcined to prepare cylinder-shaped samples and samples of capacitors in the same way as in the example 1 except that the calcined powder was added 3.0 moles of $(Ba_{0.6}Ca_{0.4})SiO_3$ as shown in Table 2, and the same tests as in the example 1 were conducted. The results are shown in Table 3.

EXAMPLE 23

Cylinder-shaped samples and samples of capacitors were prepared in the same way as in the example 21 except that 3.0 moles of mixed powder of $Li_2O$—$BaO$—$SiO_2$ (molar ratios are 2:4:4) instead of 3.0 moles of BCG was added as a second subcomponent, and the same tests as in the example 21 were conducted. The results are shown in Table 4.

Comparative Example 3

Cylinder-shaped samples and samples of capacitors were prepared in the same way as in the comparative example 1 except that 3.0 moles of mixed powder of $Li_2O$—$BaO$—$SiO_2$ (molar ratios are 2:4:4) instead of 3.0 moles of BCG was added as a second subcomponent, and the same tests as in the comparative example 1 were conducted. The results are shown in Table 4.

EXAMPLE 24

Cylinder-shaped samples and samples of capacitors were prepared in the same way as in the example 21 except that 3.0 moles of mixed powder of $B_2O_3$—BaO—$SiO_2$ (molar ratios are 1:4.5:4.5) instead of 3.0 moles of BCG was added as a second subcomponent, and the same tests as in the example 21 were conducted. The results are shown in Table 4.

Comparative Example 4

Cylinder-shaped samples and samples of capacitors were prepared in the same way as in the comparative example 1 except that 3.0 moles of mixed powder of $B_2O_3$—BaO—$SiO_2$ (molar ratios are 1:4.5:4.5) instead of 3.0 moles of BCG was added as a second subcomponent, and the same tests as in the comparative example 1 were conducted. The results are shown in Table 4.

EXAMPLE 25

Cylinder-shaped samples and samples of capacitors were prepared in the same way as in the example 21 except that 3.0 moles of mixed powder of $Li_2O$—BaO—$SiO_2$ (molar ratios are 4:2:4) instead of 3.0 moles of BCG was added as a second subcomponent, and the same tests as in the example 21 were conducted. The results are shown in Table 4.

Comparative Example 5

Cylinder-shaped samples and samples of capacitors were prepared in the same way as in the comparative example 1 except that 3.0 moles of mixed powder of $Li_2O$—BaO—$SiO_2$ (molar ratios are 4:2:4) instead of 3.0 moles of BCG was added as a second subcomponent, and the same tests as in the comparative example 1 were conducted. The results are shown in Table 4.

Furthermore, by comparing the example 12 with examples 11, 13 and 14, it was confirmed that the CR product, breakdown voltage characteristic and IR lifetime characteristic were improved by making $Y_2O_3$ as the fifth subcomponent essential at the time of calcination.

Furthermore, by comparing the examples 19 to 22 with the reference examples 1 and 2, it was confirmed that the breakdown voltage characteristic and IR lifetime characteristic were improved when the calcination temperature was 700 to 1100° C.

Also, by comparing the example 5 and the reference examples 3 to 5, it was confirmed that the IR lifetime particularly improves when the molar ratio (Ba+Mg+Ca+Sr)/(Ti+Yb+Y) of components contained in the pre-calcination powder was less than 1 and the molar ratio of (Ti+Yb+Y)/(Ba+Mg+Ca+Sr was more than 1.

Furthermore, by comparing the example 5 and the reference examples 3 to 5, it was confirmed that the IR lifetime particularly improves when the number of moles of the first subcomponent contained in the pre-calcination powder is smaller than the total moles of the fourth and fifth subcomponents (note that the numbers of moles of the fourth and fifth subcomponents were the rate of R1 alone and R2 alone, respectively).

From the results shown in FIG. 4 and Tables 1 to 4, it was found that the samples of the present embodiment satisfy the X8R characteristic, have a sufficiently high specific permittivity and insulation resistance, and have no particular problem in the dielectric loss. Note that the samples of the present example also satisfied the above explained B characteristic of the EIAJ standard and the X7R characteristic of the EIA standard other than the X8R characteristic.

Also, from the results shown in Table 4, it was confirmed that the effects of the present invention can be obtained in the case of using as the second subcomponent a sintering aid wherein silicone oxide other than BCG was the main component.

TABLE 4

| | 2nd Subcomp. | Mole | Calcination YES/NO | T2 | ϵr (1kHz) [ ] | tanD (1kHz) [%] | ρ [Ω · cm] | CR Product [MΩ μF] | VB [V] | IR Lifetime 200° C. – 15V/[m |
|---|---|---|---|---|---|---|---|---|---|---|
| Ex. 23 | * 1 | 3.0 | YES | 1260 | 2015 | 0.49 | 4.1E + 12 | 731 | 1044 | 176.5 |
| Comp. Ex. 3 | * 1 | 3.0 | NO | 1260 | 2007 | 0.51 | 3.3E + 12 | 586 | 788 | 48.2 |
| Ex. 24 | * 2 | 3.0 | YES | 1260 | 2031 | 0.53 | 3.9E + 12 | 701 | 1014 | 150.6 |
| Comp. Ex. 4 | * 2 | 3.0 | NO | 1260 | 2015 | 0.52 | 3.6E + 12 | 642 | 775 | 40.7 |
| Ex. 25 | * 3 | 3.0 | YES | 1240 | 2006 | 0.61 | 4.1E + 12 | 728 | 1055 | 166.4 |
| Comp. Ex. 5 | * 3 | 3.0 | NO | 1240 | 1985 | 0.60 | 3.2E + 12 | 562 | 793 | 51.4 |
| Ex. 21 | BCC | 3.0 | YES | 1320 | 2020 | 0.41 | 5.1E + 12 | 912 | 1212 | 171.6 |

* 1: $Li_2O$—BaO—$SiO_2$ (2:4:4)
* 2: $B_2O_3$—BaO—$SiO_2$ (1:4.5:4.5)
* 3: $Li_2O$—BaO—$SiO_2$ (4:2:4)

Evaluation 1

As shown in FIG. 4, it was confirmed that the X8R characteristic could be satisfied by all of the examples 1 to 5 of the present invention. Further, as shown in Table 1, by the comparing examples 1 to 5 with comparative example 1, it was confirmed that the breakdown voltage characteristic and IR lifetime were improved according to a method of the present invention.

Also, by comparing the examples 1 to 5 with 11 to 18, it was confirmed that the insulation resistance, breakdown voltage characteristic and IR accelerated lifetime were improved by increasing an amount of additives of a rare-earth element (Y or Yb, etc.) at the time of calcination.

EXAMPLE 101

As shown in Table 5 and Table 6, cylinder-shaped samples and samples of capacitors were prepared in the same way as in the example 1 except for the items described below, and the same tests as in the example 1 were conducted. The results are shown in Table 7.

In the present example 101, $CaZrO_3$ (hereinafter, also referred to as CZ) as a sixth subcomponent was prepared in addition to the composition shown in the example 1. $CaZrO_3$ was produced by mixing $CaCO_3$ and $ZrO_3$ by wet mixing by a ball-mill for 16 hours, drying the result, then firing at 1150° C. in the air, further performing wet mixing by a ball-mill for 24 hours.

The CZ was added to pre-calcination powder by an amount of 1 mole together with 3.0 moles of $(Ba_{0.6}Ca_{0.4})SiO_3$ (described as BCG in the table), 0.374 mole of $MnCO_3$, 0.1 mole of $V_2O_5$, 1.0 mole of $Yb_2O_3$ and 2.0 moles of $Y_2O_3$ as shown in Table 6.

The pre-calcination powder was prepared in the same way as in the example 1 by mixing $BaTiO_3$ as a main component with $MgCO_3$ as an ingredient of a first subcomponent and drying the result. As shown in Table 5, the pre-calcination powder contained 0.9 mole of $MgCO_3$ with respect to 100 moles of BaTiO3 (described as BT in the table). When investigating the molar ratio of a specific component, (Ba+Mg+Ca)/(Ti+Zr+Yb+Y) in the pre-calcination powder, it was 1.009 and (Ba+Ca+Yb+Y)/(Ti+Mg+Zr) was 0.991 as shown in Table 5.

Also, the calcination holding temperature (T1 in Table 6) was 900° C., which was different from that in the example 1 (1000° C.).

Also, the holding temperature at firing (T2 in Table 6) in the present example 101 was different from that in the example 1 (1320° C.) and 1300° C. as shown in Table 6.

Furthermore, in the present example 101, a test of the IR lifetime (high temperature accelerated lifetime) under a DC electric field was conducted, and the accelerating test was conducted under the electric field of $18V/\mu m$ which was different from that in the example 1 ($15V/\mu m$).

Other than the above, cylinder-shaped samples and samples of capacitors were prepared in the same way as in the example 1 and the same tests as in the example 1 were conducted. The results are shown in Table 7.

TABLE 5

| | | Composition at calcination | | | | | | | | Mole Ratio (Ba + Mg + Ca)/(Ti + Zr + Yb + Y) | Mole Ratio (Ba + Ca + Yb + Y)/(Ti + Mg + Zr) |
|---|---|---|---|---|---|---|---|---|---|---|---|
| | | BT | MgCO₃ | MnCO₃ | BCG | V₂O₅ | Yb₂O₃ | Y₂O₃ | CZ | | |
| Ex. 101 | BT + Mg | 100 | 0.9 | 0.000 | 0.0 | 0.0 | 0.0 | 0.0 | 0.0 | 1.009 | 0.991 |
| Ex. 102 | BT + Mg + CZ | 100 | 0.9 | 0.000 | 0.0 | Q.0 | 0.0 | 0.0 | 1.0 | 1.009 | 0.991 |
| Ex. 103 | BT + Mg + Y + CZ | 100 | 0.9 | 0.000 | 0.0 | 0.0 | 0.0 | 1.0 | 1.0 | 0.989 | 0.991 |
| Ex. 104 | BT + Mg + YL) + CZ | 100 | 0.9 | 0.000 | 0.0 | 0.0 | 1.0 | 0.0 | 1.0 | 0.989 | 1.011 |
| Ex. 105 | BT + Mg + Yb + Y + CZ | 100 | 0.9 | 0.000 | 0.0 | 0.0 | 1.0 | 2.0 | 1.0 | 0.952 | 1.051 |
| Ex. 106 | BT + Mg + Yb + Y + Mn + V + CZ | 100 | 0.9 | 0.374 | 0.0 | 0.1 | 1.0 | 2.0 | 1.0 | 0.952 | 1.051 |
| Ex. 107 | Calcination only BT | 100 | 0.0 | 0.000 | 0.0 | 0.0 | 0.0 | 0.0 | 0.0 | 1.000 | 1.000 |
| Comp. Ex. 101 | Calcination only BT | 0 | 0.0 | 0.000 | 0.0 | 0.0 | 0.0 | 0.0 | 0.0 | 1.000 | 1.000 |
| Comp. Ex. 102 | BT + Mg + BCG | 100 | 0.9 | 0.000 | 3.0 | 0.0 | 0.0 | 0.0 | 0.0 | 1.009 | 0.991 |
| Ex. 108 | BT + Mg + Yb | 100 | 0.9 | 0.000 | 0.0 | 0.0 | 1.0 | 0.0 | 0.0 | 0.989 | 1.011 |
| Ex. 109 | BT + Mg + Y | 100 | 0.9 | 0.000 | 0.0 | 0.0 | 0.0 | 2.0 | 0.0 | 0.970 | 1.031 |
| Ex. 110 | BT + Mg + Yb + Y | 100 | 0.9 | 0.000 | 0.0 | 0.0 | 1.0 | 2.0 | 0.0 | 0.952 | 1.051 |
| Ex. 111 | BT + Mg + Yb + Y + Mn + V | 100 | 0.9 | 0.374 | 0.0 | 0.1 | 1.0 | 2.0 | 0.0 | 0.952 | 1.051 |
| Ex. 112 | BT + CZ | 100 | 0.0 | 0.000 | 0.0 | 0.0 | 0.0 | 0.0 | 1.0 | 1.000 | 1.000 |
| Ref. Ex. 101 | BT + Mg + Yb + Y + Mn + V + CZ | 100 | 0.9 | 0.374 | 0.0 | 0.1 | 1.1 | 2.0 | 0.0 | 0.952 | 1.051 |
| Ex. 113 | BT + Mg + Yb + Y + Mn + V + CZ | 100 | 0.9 | 0.374 | 0.0 | 0.1 | 1.0 | 2.0 | 0.0 | 0.952 | 1.051 |
| Ex. 114 | BT + Mg + Yb + Y + Mn + V + CZ | 100 | 0.9 | 0.374 | 0.0 | 0.1 | 1.0 | 2.0 | 0.0 | 0.952 | 1.051 |
| Ex. 115 | BT + Mg + Yb + Y + Mn + V + CZ | 100 | 0.9 | 0.374 | 0.0 | 0. | 1.0 | 2.0 | 0.0 | 0.952 | 1.051 |
| Ex. 116 | BT + Mg + Yb + Y + Mn + V + CZ | 100 | 0.9 | 0.374 | 0.0 | 0.1 | 1.0 | 2.0 | 0.0 | 0.952 | 1.051 |
| Ref. Ex. 102 | BT + Mg + Yb + Y + Mn + V + CZ | 100 | 0.9 | 0.374 | 0.0 | 0.1 | 1.0 | 2.0 | 0.0 | 0.952 | 1.051 |
| Ex. 117 | BT + Mg + Yb + Mn + V | 100 | 3.5 | 0.374 | 0.0 | 0.1 | 1.0 | 0.0 | 0.0 | 1.015 | 0.986 |
| Ex. 118 | BT + Mg + Yb + Mn + V | 100 | 3.0 | 0.374 | 0.0 | 0.1 | 0.5 | 0.0 | 0.0 | 1.020 | 0.981 |
| Ex. 119 | BT + Mg + Yb + Y + Mn + V | 100 | 3.0 | 0.374 | 0.0 | 0.1 | 0.5 | 0.5 | 0.0 | 1.010 | 0.990 |

TABLE 6

| | | Composition of components additionally added at time of coating | | | | | | | | |
|---|---|---|---|---|---|---|---|---|---|---|
| | T1 | BT | MgCO₃ | MnCO₃ | BCG | V₂O₅ | Yb₂O₃ | Y₂O₃ | CZ | T2 |
| Ex. 101 | 900 | 0 | 0.0 | 0.374 | 3.0 | 0.1 | 1.0 | 2.0 | 1.0 | 1300 |
| Ex. 102 | 900 | 0 | 0.0 | 0.374 | 3.0 | 0.1 | 1.0 | 2.0 | 0.0 | 1300 |
| Ex. 103 | 900 | 0 | 0.0 | 0.374 | 3.0 | 0.1 | 1.0 | 0.0 | 0.0 | 1300 |
| Ex. 104 | 900 | 0 | 0.0 | 0.374 | 3.0 | 0.1 | 0.0 | 2.0 | 0.0 | 1300 |
| Ex. 105 | 900 | 0 | 0.0 | 0.374 | 3.0 | 0.1 | 0.0 | 0.0 | 0.0 | 1300 |
| Ex. 106 | 900 | 0 | 0.0 | 0.000 | 3.0 | 0.0 | 0.0 | 0.0 | 0.0 | 1300 |
| Ex. 107 | 900 | 0 | 0.9 | 0.374 | 3.0 | 0.1 | 1.0 | 2.0 | 1.0 | 1300 |
| Comp. Ex. 101 | No | 100 | 0.9 | 0.374 | 3.0 | 0.1 | 1.0 | 2.0 | 1.0 | 1300 |
| Comp. Ex. 102 | 900 | 0 | 0.0 | 0.374 | 0.0 | 0.1 | 1.0 | 2.0 | 1.0 | 1300 |
| Ex. 108 | 900 | 0 | 0.0 | 0.374 | 3.0 | 0.1 | 0.0 | 2.0 | 0.0 | 1300 |
| Ex. 109 | 900 | 0 | 0.0 | 0.374 | 3.0 | 0.1 | 1.0 | 0.0 | 1.0 | 1300 |
| Ex. 110 | 900 | 0 | 0.0 | 0.374 | 3.0 | 0.1 | 0.0 | 0.0 | 1.0 | 1300 |
| Ex. 111 | 900 | 0 | 0.0 | 0.000 | 3.0 | 0.0 | 0.0 | 0.0 | 1.0 | 1300 |
| Ex. 112 | 900 | 0 | 0.9 | 0.374 | 3.0 | 0.1 | 1.0 | 2.0 | 0.0 | 1300 |
| Ref. Ex. 101 | 600 | 0 | 0.0 | 0.000 | 3.0 | 0.0 | 0.0 | 0.0 | 1.0 | 1300 |
| Ex. 113 | 700 | 0 | 0.0 | 0.000 | 3.0 | 0.0 | 0.0 | 0.0 | 1.0 | 1300 |

TABLE 6-continued

| | Composition of components additionally added at time of coating | | | | | | | | | |
|---|---|---|---|---|---|---|---|---|---|---|
| | T1 | BT | MgCO$_3$ | MnCO$_3$ | BCG | V$_2$O$_5$ | Yb$_2$O$_3$ | Y$_2$O$_3$ | CZ | T2 |
| Ex. 114 | 800 | 0 | 0.0 | 0.000 | 3.0 | 0.0 | 0.0 | 0.0 | 1.0 | 1300 |
| Ex. 115 | 1000 | 0 | 0.0 | 0.000 | 3.0 | 0.0 | 0.0 | 0.0 | 1.0 | 1300 |
| Ex. 116 | 1100 | 0 | 0.0 | 0.000 | 3.0 | 0.0 | 0.0 | 0.0 | 1.0 | 1300 |
| Ref. Ex. 102 | 1200 | 0 | 0.0 | 0.000 | 3.0 | 0.0 | 0.0 | 0.0 | 1.0 | 1300 |
| Ex. 117 | 1000 | 0 | 0.0 | 0.000 | 3.0 | 0.0 | 0.0 | 0.0 | 1.0 | 1320 |
| Ex. 118 | 1000 | 0 | 0.0 | 0.000 | 3.0 | 0.0 | 0.0 | 0.0 | 1.0 | 1320 |
| Ex. 119 | 1000 | 0 | 0.0 | 0.000 | 3.0 | 0.0 | 0.01 | 0.0 | 1.0 | 1320 |

TABLE 7

| | ∈r (1 kHz) [ ] | tan D (1 kHz) [%] | ρ [Ω · cm] | CR Product [MΩ μF] | VB [V] | IR Lifetime 200° C.- 15 V/μm |
|---|---|---|---|---|---|---|
| Ex. 101 | 1923 | 0.63 | 4.2E+12 | 715 | 1218 | 39.0 |
| Ex. 102 | 1955 | 0.66 | 3.7E+12 | 640 | 1008 | 78.2 |
| Ex. 103 | 1973 | 0.61 | 3.7E+12 | 646 | 1101 | 198.1 |
| Ex. 104 | 1911 | 0.63 | 3.2E+12 | 541 | 1095 | 180.6 |
| Ex. 105 | 1993 | 0.63 | 2.9E+12 | 512 | 1190 | 240.1 |
| Ex. 106 | 1917 | 0.67 | 3.8E+12 | 645 | 1011 | 364.7 |
| Ex. 107 | 2034 | 0.76 | 3.2E+12 | 576 | 1055 | 73.3 |
| Comp. Ex. 101 | 1915 | 0.69 | 3.9E+12 | 661 | 1088 | 91.5 |
| Comp. Ex. 102 | 1859 | 0.52 | 3.3E+12 | 543 | 1082 | 18.5 |
| Ex. 108 | 1918 | 0.63 | 3.3E+12 | 560 | 1019 | 139.5 |
| Ex. 109 | 1923 | 0.62 | 3.7E+12 | 630 | 1100 | 187.0 |
| Ex. 110 | 1995 | 0.65 | 3.7E+12 | 653 | 1227 | 257.8 |
| Ex. 111 | 1908 | 0.65 | 3.5E+12 | 591 | 1088 | 390.7 |
| Ex. 112 | 2020 | 1.20 | 3.2E+12 | 572 | 1043 | 71.1 |
| Ref. Ex. 101 | 1920 | 0.63 | 3.3E+12 | 561 | 824 | 97.2 |
| Ex. 113 | 1865 | 0.66 | 3.6E+12 | 594 | 996 | 275.5 |
| Ex. 114 | 1872 | 0.59 | 3.5E+12 | 580 | 1095 | 400.3 |
| Ex. 115 | 1915 | 0.61 | 3.5E+12 | 593 | 1100 | 310.6 |
| Ex. 116 | 1987 | 0.73 | 3.4E+12 | 598 | 915 | 121.2 |
| Ref. Ex. 102 | 2089 | 0.72 | 3.7E+12 | 684 | 766 | 60.0 |
| Ex. 117 | 2134 | 0.96 | 1.3E+13 | 246 | 1060 | 3.3 |
| Ex. 118 | 2288 | 0.55 | 1.2E+13 | 243 | 1102 | 8.1 |
| Ex. 119 | 2008 | 0.65 | 1.1E+13 | 195 | 1173 | 10.5 |

EXAMPLE 102

Pre-calcination powder was prepared by mixing BaTiO$_3$ as a main component, MgCO$_3$ as an ingredient of a first subcomponent and CaZrO$_3$ as a sixth subcomponent and drying them. As shown in Table 5, the pre-calcination powder contained 0.9 mole of MgCO$_3$ and 1.0 mole of CaZrO$_3$ with respect to 100 moles of BaTiO$_3$. When investigating the molar ratio of a specific component (Ba+Mg+Ca)/(Ti+Zr+Yb+Y) in the pre-calcination powder, it was 1.009, and the molar ratio of (Ba+Ca+Yb+Y)/(Ti+Mg+Zr) was 0.991 as shown in Table 5.

Next, the pre-calcination powder was calcined to prepare cylinder-shaped samples and samples of capacitors in the same way as in the example 101 except that the calcined powder was added 3.0 moles of (Ba$_{0.6}$Ca$_{0.4}$)SiO$_3$, 0.374 mole of MnCO$_3$, 0.1 mole of V$_2$O$_5$, 1.0 mole of Yb$_2$O$_3$ and 2.0 moles of Y$_2$O$_3$ as shown in Table 6, and the same tests as in the example 101 were conducted. The results are shown in Table 7.

EXAMPLE 103

Pre-calcination powder was prepared by mixing BaTiO$_3$ as a main component, MgCO$_3$ as an ingredient of a first subcomponent, Y$_2$O$_3$ as a fifth subcomponent and CaZrO$_3$ as a sixth subcomponent and drying them. As shown in Table 5, the pre-calcination powder contained 0.9 mole of MgCO$_3$, 2.0 moles of Y$_2$O$_3$ and 1.0 mole of CaZrO$_3$ with respect to 100 moles of BaTiO$_3$. When investigating the molar ratio of a specific component (Ba+Mg+Ca)/(Ti+Zr+Yb+Y) in the pre-calcination powder, it was 0.989, and the molar ratio of (Ba+Ca+Yb+Y)/(Ti+Mg+Zr) was 1.011 as shown in Table 5.

Next, the pre-calcination powder was calcined to prepare cylinder-shaped samples and samples of capacitors in the same way as in the example 101 except that the calcined powder was added 3.0 moles of (Ba$_{0.6}$Ca$_{0.4}$)SiO$_3$, 0.374 mole of MnCO$_3$, 0.1 mole of V$_2$O$_5$ and 1.0 mole of Yb$_2$O$_3$ as shown in Table 6, and the same tests as in the example 101 were conducted. The results are shown in Table 7.

EXAMPLE 104

Pre-calcination powder was prepared by mixing BaTiO$_3$ as a main component, MgCO$_3$ as an ingredient of a first subcomponent, Yb$_2$O$_3$ as a fourth subcomponent and CaZrO$_3$ as a sixth subcomponent and drying them. As shown in Table 5, the pre-calcination powder contained 0.9 mole of MgCO$_3$, 1.0 mole of Yb$_2$O$_3$ and 1.0 mole of CaZrO$_3$ with respect to 100 moles of BaTiO$_3$. When investigating the molar ratio of a specific component (Ba+Mg+Ca)/(Ti+Zr+Yb+Y) in the pre-calcination powder, it was 0.989, and the molar ratio of (Ba+Ca+Yb+Y)/(Ti+Mg+Zr) was 1.011 as shown in Table 5.

Next, the pre-calcination powder was calcined to prepare cylinder-shaped samples and samples of capacitors in the same way as in the example 101 except that the calcined powder was added 3.0 moles of $(Ba_{0.6}Ca_{0.4})SiO_3$, 0.374 mole of $MnCO_3$, 0.1 mole of $V_2O_5$ and 2.0 moles of $Y_2O_3$ as shown in Table 6, and the same tests as in the example 101 were conducted. The results are shown in Table 7.

EXAMPLE 105

Pre-calcination powder was prepared by mixing $BaTiO_3$ as a main component, $MgCO_3$ as an ingredient of a first subcomponent, $Yb_2O_3$ as a fourth subcomponent, $Y_2O_3$ as a fifth subcomponent and $CaZrO_3$ as a sixth subcomponent and drying them. As shown in Table 5, the pre-calcination powder contained 0.9 mole of $MgCO_3$, 1.0 moles of $Yb_2O_3$, 2.0 moles of $Y_2O_3$ and 1.0 mole of $CaZrO_3$ with respect to 100 moles of $BaTiO_3$. When investigating the molar ratio of a specific component $(Ba+Mg+Ca)/(Ti+Zr+Yb+Y)$ in the pre-calcination powder, it was 0.952, and the molar ratio of $(Ba+Ca+Yb+Y)/(Ti+Mg+Zr)$ was 1.051 as shown in Table 5.

Next, the pre-calcination powder was calcined to prepare cylinder-shaped samples and samples of capacitors in the same way as in the example 101 except that the calcined powder was added 3.0 moles of $(Ba_{0.6}Ca_{0.4})SiO_3$, 0.374 mole of $MnCO_3$ and 0.1 mole of $V_2O_5$ as shown in Table 6, and the same tests as in the example 101 were conducted. The results are shown in Table 7.

EXAMPLE 106

Pre-calcination powder was prepared by mixing $BaTiO_3$ as a main component, $MgCO_3$ as an ingredient of a first subcomponent, $V_2O_5$ as a third subcomponent, $Yb_2O_3$ as a fourth subcomponent, $Y_2O_3$ as a fifth subcomponent, $CaZrO_3$ as a sixth subcomponent and $MnCO_3$ as an ingredient of a seventh subcomponent and drying them. As shown in Table 5, the pre-calcination powder contained 0.9 mole of $MgCO_3$, 0.374 mole of $MnCO_3$, 0.1 mole of $V_2O_5$, 1.0 moles of $Yb_2O_3$, 2.0 moles of $Y_2O_3$ and 1.0 mole of $CaZrO_3$ with respect to 100 moles of $BaTiO_3$. When investigating the molar ratio of a specific component $(Ba+Mg+Ca)/(Ti+Zr+Yb+Y)$ in the pre-calcination powder, it was 0.952, and the molar ratio of $(Ba+Ca+Yb+Y)/(Ti+Mg+Zr)$ was 1.051 as shown in Table 5.

Next, the pre-calcination powder was calcined to prepare cylinder-shaped samples and samples of capacitors in the same way as in the example 101 except that the calcined powder was added 3.0 moles of $(Ba_{0.6}Ca_{0.4})SiO_3$ as shown in Table 6, and the same tests as in the example 101 were conducted. The results are shown in Table 5.

EXAMPLE 107

Pre-calcination powder was prepared by mixing only $BaTiO_3$ as a main component and drying them. When investigating the molar ratio of a specific component $(Ba+Mg+Ca)/(Ti+Zr+Yb+Y)$ in the pre-calcination powder, it was 1.000, and the molar ratio of $(Ba+Ca+Yb+Y)/(Ti+Mg+Zr)$ was 1.000 as shown in Table 5.

Next, the pre-calcination powder was calcined to prepare cylinder-shaped samples and samples of capacitors in the same way as in the example 101 except that the calcined powder was added 3.0 moles of $(Ba_{0.6}Ca_{0.4})SiO_3$, 0.9 mole of $MgCO_3$, 0.374 mole of $MnCO_3$ and 0.1 mole of $V_2O_5$, 1.0 mole of $Yb_2O_3$, 2.0 moles of Y2 3 and 1.0 mole of $CaZrO_3$ as shown in Table 6, and the same tests as in the example 101 were conducted. The results are shown in Table 7.

Figure 8:
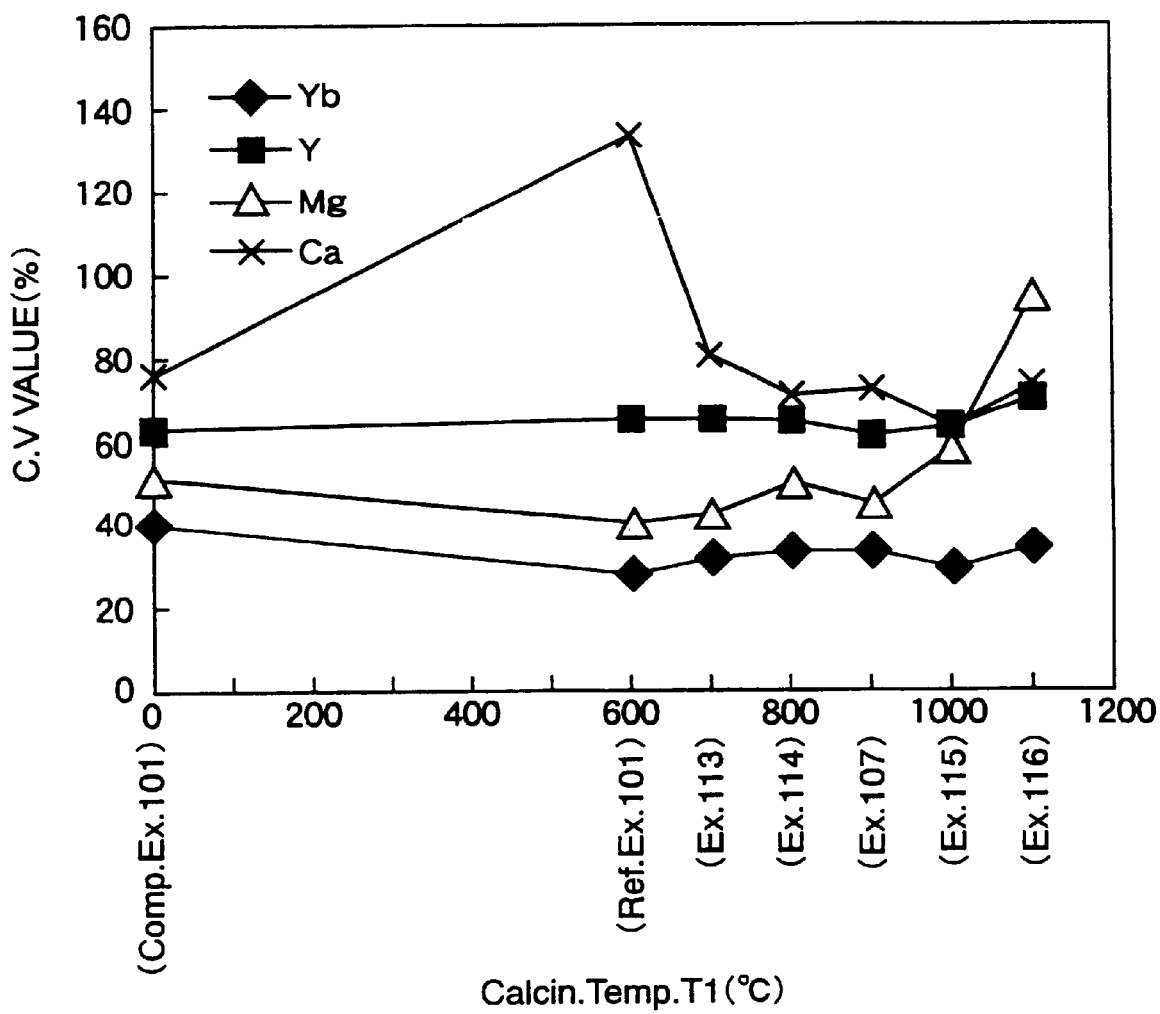
FIG. 8 is a graph of dispersion degrees of additives in powder after calcination.
Figure 13:
FIG. 13 is a picture of a TEM observation image of calcined powder in a dielectric ceramic composition according an example 107.

Furthermore, in the present example, the degree of dispersion of the additives (Yb, Y, Mg and Ca) in the calcined powder is shown in FIG. 8. Also, a TEM observation image of the calcined powder in the present example is shown in FIG. 13.

Note that the C.V value (%) indicating the degree of dispersion indicates that the lower the value the better the degree of dispersion in FIG. 8. The C.V. value was obtained by preparing a histogram of a count value of an X-ray in the EPMA analysis, obtaining an standard deviation a and average value x thereof and calculating C.V=σ/x. The TEM observation image was taken by using a product number JEM-3010 made by JEOL Ltd. Note that a sample for TEM observation was produced by dispersing the powder sample in ethanol, then dropping on a microgrid, and drying the result.

Comparative Example 101

As shown in Table 5 and Table 6, cylinder-shaped samples and samples of capacitors in the same way as in the example 101 except that calcination was not performed and that firing was performed by using mixed powder wherein 0.9 mole of $MgCo_3$, 0.374 mole of $MnCO_3$, 3.0 moles of $(Ba_{0.6}Ca_{0.4})SiO_3$, 0.1 mole of $V_2O_5$, 1.0 mole of $Yb_2O_3$, 2.0 moles of $Y_2O_3$ and 1.0 mole of $CaZrO_3$ were added to 100 moles of $BaTiO_3$ as a main component. The same tests as in the example 101 were conducted. The results are shown in Table 7. Note that the molar ratio of a specific component $(Ba+Mg+Ca)/(Ti+Zr+Yb+Y)$ in the composition was investigated to be 1.000, and the molar ratio of $(Ba+Ca+Yb+Y)/(Ti+Mg+Zr)$ was 1.000 as shown in Table 5.

Figure 9:
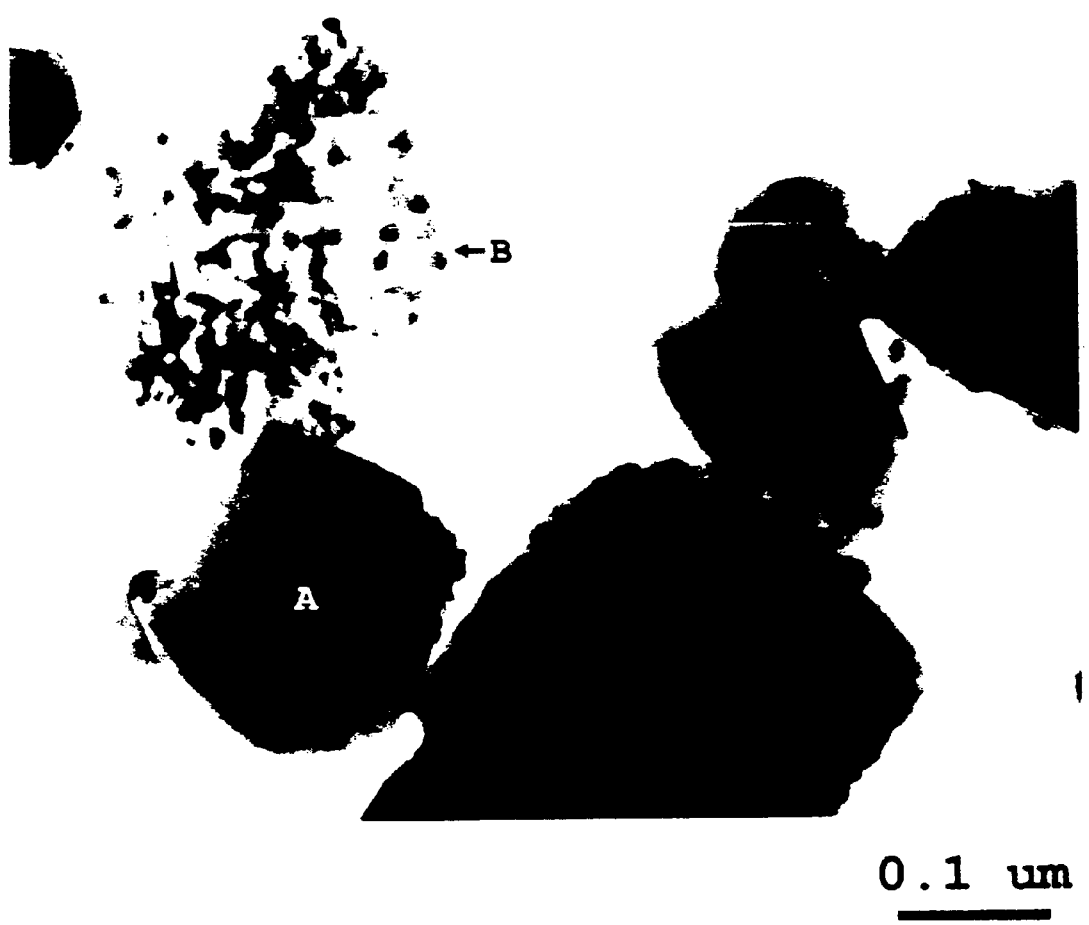
FIG. 9 is a picture of a TEM observation image of mixed powder before firing in a dielectric ceramic composition according to a comparative example 101.

Also, the degree of dispersion of the additives (Yb, Y, Mg and Ca) in the mixed powder before firing in the comparative example 101 is shown in FIG. 8. Also, a TEM observation image of the mixed powder before firing in the comparative example 101 is shown in FIG. 9.

Comparative Example 102

Pre-calcination powder (not containing CZ) was prepared by mixing $BaTiO_3$ as a main component, $MgCO_3$ as an ingredient of a first subcomponent and $(Ba_{0.6}Ca_{0.4})SiO_3$ as a second subcomponent and drying them. As shown in Table 5, the pre-calcination powder contained 0.9 mole of $MgCO_3$ and 3.0 moles of $(Ba_{0.6}Ca_{0.4})SiO_3$ with respect to 100 moles of $BaTiO_3$. When investigating the molar ratio of a specific component $(Ba+Mg+Ca)/(Ti+Zr+Yb+Y)$ in the pre-calcination powder, it was 1.009, and the molar ratio of $(Ba+Ca+Yb+Y)/(Ti+Mg+Zr)$ was 0.991 as shown in Table 5.

Next, the pre-calcination powder was calcined to prepare cylinder-shaped samples and samples of capacitors in the same way as in the example 101 except that the calcined powder was added 3.0 moles of $(Ba_{0.6}Ca_{0.4})SiO_3$, 0.374 mole of $MnCO_3$, 0.1 mole of $V_2O_5$, 1.0 mole of $Yb_2O_3$ and 2.0 moles of $Y_2O_3$ (CZ was not contained) as shown in Table 6, and the same tests as in the example 101 were conducted. The results are shown in Table 7.

EXAMPLE 108

As shown in Tables 5 and 6, cylinder-shaped samples and samples of capacitors were prepared in the same way as in the above example 104 except that CZ was added at the time of making coating, and the same tests as in the example 101 were conducted. The results are shown in Table 7.

EXAMPLE 109

As shown in Tables 5 and 6, cylinder-shaped samples and samples of capacitors were prepared in the same way as in the above example 103 except that CZ was added at the time of making coating, and the same tests as in the example 101 were conducted. The results are shown in Table 7.

EXAMPLE 110

As shown in Tables 5 and 6, cylinder-shaped samples and samples of capacitors were prepared in the same way as in the above example 105 except that CZ was added at the time of making coating, and the same tests as in the example 101 were conducted. The results are shown in Table 7.

EXAMPLE 111

As shown in Tables 5 and 6, cylinder-shaped samples and samples of capacitors were prepared in the same way as in the above example 106 except that CZ was added at the time of making coating, and the same tests as in the example 101 were conducted. The results are shown in Table 7.

EXAMPLE 112

As shown in Tables 5 and 6, cylinder-shaped samples and samples of capacitors were prepared in the same way as in the example 101 except that CZ instead of $MgCO_3$ as an ingredient of a first subcomponent was added to the pre-calcination powder, and the same tests as in the example 101 were conducted. The results are shown in Table 7.

Reference Example 101

Cylinder-shaped samples and samples of capacitors were prepared in the same way as in the above example 106 except that the calcination temperature (T1) was set to be 600° C., and the same tests as in the example 101 were conducted. The results are shown in Table 7.

Figure 10:
FIG. 10 is a picture of a TEM observation image of calcined powder in a dielectric ceramic composition according to a reference example 101.

Also, the degree of dispersion of the additives (Yb, Y, Mg and Ca) in the calcined powder in the reference example is shown in FIG. 8. Also, a TEM observation image of the calcined powder in the reference example 101 is shown in FIG. 10.

EXAMPLE 113

Cylinder-shaped samples and samples of capacitors were prepared in the same way as in the above example 106 except that the calcination temperature (T1) was set to be 700° C., and the same tests as in the example 101 were conducted. The results are shown in Table 7.

Figure 11:
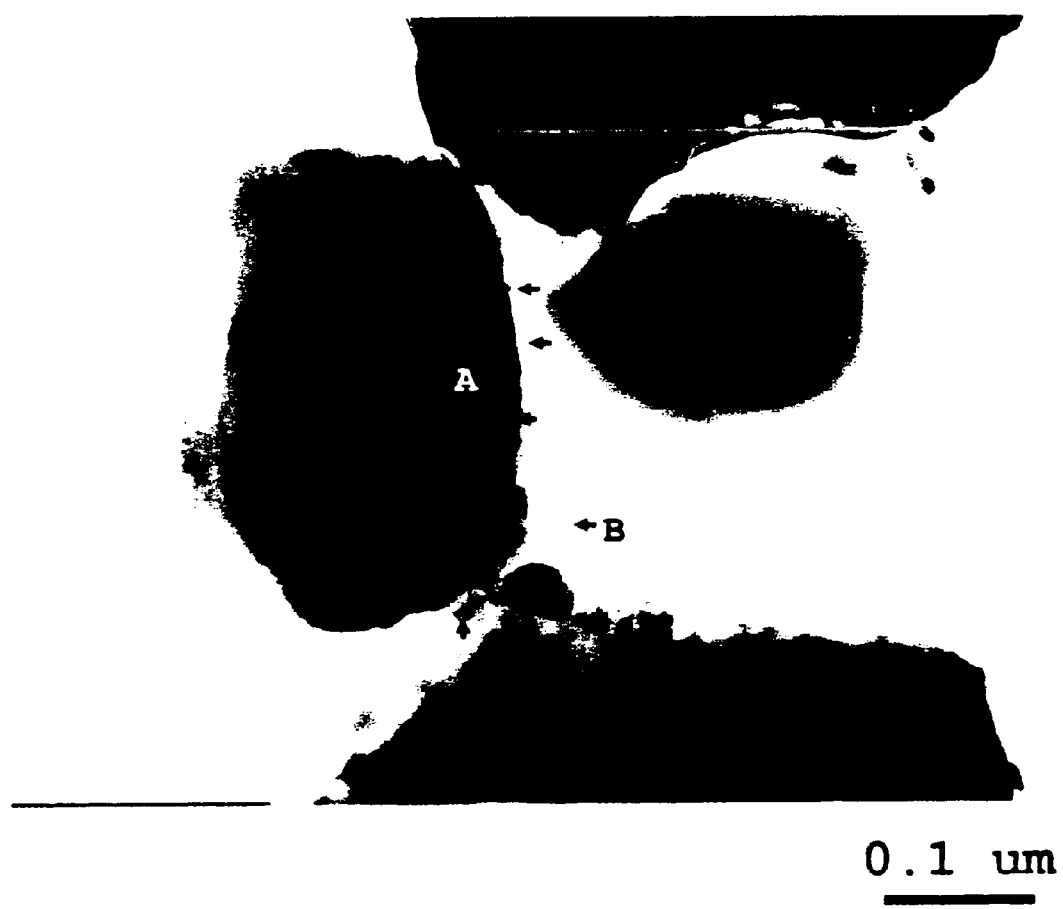
FIG. 11 is a picture of a TEM observation image of calcined powder in a dielectric ceramic composition according to an example 113.

Also, the degree of dispersion of the additives (Yb, Y, Mg and Ca) in the calcined powder in the present example is shown in FIG. 8. Also, a TEM observation image of the calcined powder in the present example is shown in FIG. 11.

EXAMPLE 114

Cylinder-shaped samples and samples of capacitors were prepared in the same way as in the above example 106 except that the calcination temperature (T1) was set to be 800° C., and the same tests as in the example 101 were conducted. The results are shown in Table 7.

Figure 12:
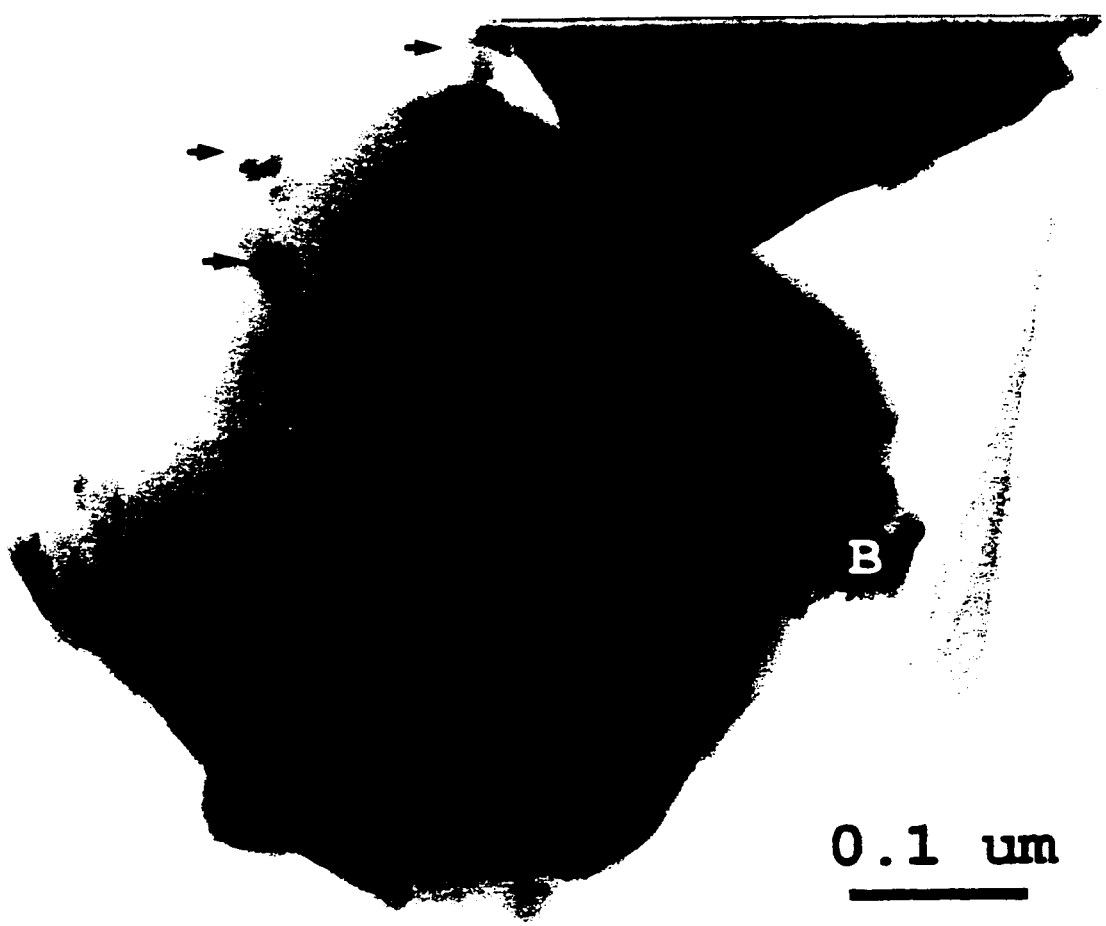
FIG. 12 is a picture of a TEM observation image of calcined powder in a dielectric ceramic composition according an example 114.

Also, the degree of dispersion of the additives (Yb, Y, Mg and Ca) in the calcined powder in the present example is shown in FIG. 8. Also, a TEM observation image of the calcined powder in the present example is shown in FIG. 12.

EXAMPLE 115

Cylinder-shaped samples and samples of capacitors were prepared in the same way as in the above example 106 except that the calcination temperature (T1) was set to be 1000° C., and the same tests as in the example 101 were conducted. The results are shown in Table 7.

Figure 14:
FIG. 14 is a picture of a TEM observation image of calcined powder in a dielectric ceramic composition according an example 115.

Also, the degree of dispersion of the additives (Yb, Y, Mg and Ca) in the calcined powder in the present example is shown in FIG. 8. Also, a TEM observation image of the calcined powder in the present example is shown in FIG. 14.

EXAMPLE 116

Cylinder-shaped samples and samples of capacitors were prepared in the same way as in the above example 106 except that the calcination temperature (T1) was set to be 1100° C., and the same tests as in the example 101 were conducted. The results are shown in Table 7.

Figure 15:
FIG. 15 is a picture of a TEM observation image of calcined powder in a dielectric ceramic composition according to a reference example 102.

Also, the degree of dispersion of the additives (Yb, Y, Mg and Ca) in the calcined powder in the present example is shown in FIG. 8. Also, a TEM observation image of the calcined powder in the present example is shown in FIG. 15.

Reference Example 102 Cylinder-shaped samples and samples of capacitors were prepared in the same way as in the above example 106 except that the calcination temperature (T1) was set to be 1200° C., and the same tests as in the example 101 were conducted. The results are shown in Table 7.

EXAMPLE 117

Pre-calcination powder was prepared by mixing $BaTiO_3$ as a main component, $MgCO_3$ as an ingredient of a first subcomponent, $V_2O_5$ as a third subcomponent, $Yb_2O_3$ as a fourth subcomponent and $MnCO_3$ as an ingredient of a seventh subcomponent and drying them. As shown in Table 5, the pre-calcination powder contained 3.5 moles of $MgCO_3$, 0.374 mole of $MnCO_3$, 0.1 mole of $V_2O_5$ and 1.0 mole of $Yb_2O_3$ with respect to 100 moles of $BaTiO_3$. When investigating the molar ratio of a specific component (Ba+Mg+Ca)/(Ti+Zr+Yb+Y) in the pre-calcination powder, it was 1.015, and the molar ratio of (Ba+Ca+Yb+Y)/(Ti+Mg+Zr) was 0.986 as shown in Table 5.

Next, the pre-calcination powder was calcined at 1000° C. to prepare cylinder-shaped samples and samples of capacitors in the same way as in the example 101 except that the calcined powder was added 3.0 moles of $(Ba\ 0.6\ Ca_{0.4})SiO_3$ and 1.0 mole of $CaZrO_3$ as shown in Table 6 and subjected to firing at 1320 ° C., and the same tests as in the example 101 were conducted. The results are shown in Table 5.

EXAMPLE 118

Pre-calcination powder was prepared by mixing $BaTiO_3$ as a main component, $MgCO_3$ as an ingredient of a first subcomponent, $V_2O_5$ as a third subcomponent, $Yb_2O_3$ as a fourth subcomponent and $MnCO_3$ as an ingredient of a seventh subcomponent and drying them. As shown in Table 5, the pre-calcination powder contained 3.0 moles of $MgCO_3$, 0.374 mole of $MnCO_3$, 0.1 mole of $V_2O$ and 0.5 mole of $Yb_2O_3$ with respect to 100 moles of $BaTiO_3$. When investigating the molar ratio of a specific component (Ba+Mg+Ca)/(Ti+Zr+Yb+Y) in the pre-calcination powder, it was 1.020, and the molar ratio of (Ba+Ca+Yb+Y)/(Ti+Mg+Zr) was 0.981 as shown in Table 5.

Next, the pre-calcination powder was calcined at 1000° C. to prepare cylinder-shaped samples and samples of capacitors in the same way as in the above example 101 except that the calcined powder was added 3.0 moles of $(Ba_{0.6}Ca_{0.4})SiO_3$ and 1.0 mole of $CaZrO_3$ as shown in Table 6 and subjected to firing at 1320° C., and the same tests as in the example 101 were conducted. The results are shown in Table 5.

EXAMPLE 119

Pre-calcination powder was prepared by mixing $BaTiO_3$ as a main component, $MgCO_3$ as an ingredient of a first subcomponent, $V_2O_5$ as a third subcomponent, $Yb_2O_3$ as a fourth subcomponent, $Y_2O_3$ as a fifth subcomponent and $MnCO_3$ as an ingredient of a seventh subcomponent and drying them. As shown in Table 5, the pre-calcination powder contained 3.0 moles of $MgCO_3$, 0.374 mole of $MnCO_3$, 0.1 mole of $V_2O_5$, 0.5 mole of $Yb_2O_3$ and 0.5 mole of $Y_2O_3$ with respect to 100 moles of $BaTiO_3$. When investigating the molar ratio of a specific component (Ba+Mg+Ca)/(Ti+Zr+Yb+Y) in the pre-calcination powder, it was 1.010, and the molar ratio of (Ba+Ca+Yb+Y)/(Ti+Mg+Zr) was 0.990 as shown in Table 5.

Next, the pre-calcination powder was calcined at 1000° C. to prepare cylinder-shaped samples and samples of capacitors in the same way as in the example 101 except that the calcined powder was added 3.0 moles of $(Ba_{0.6}Ca_{0.4})SiO_3$ and 1.0 mole of $CaZrO_3$ as shown in Table 6 and subjected to firing at 1320° C., and the same tests as in the example 101 were conducted. The results are shown in Table 5.

Reference Example 103

Figure 5:
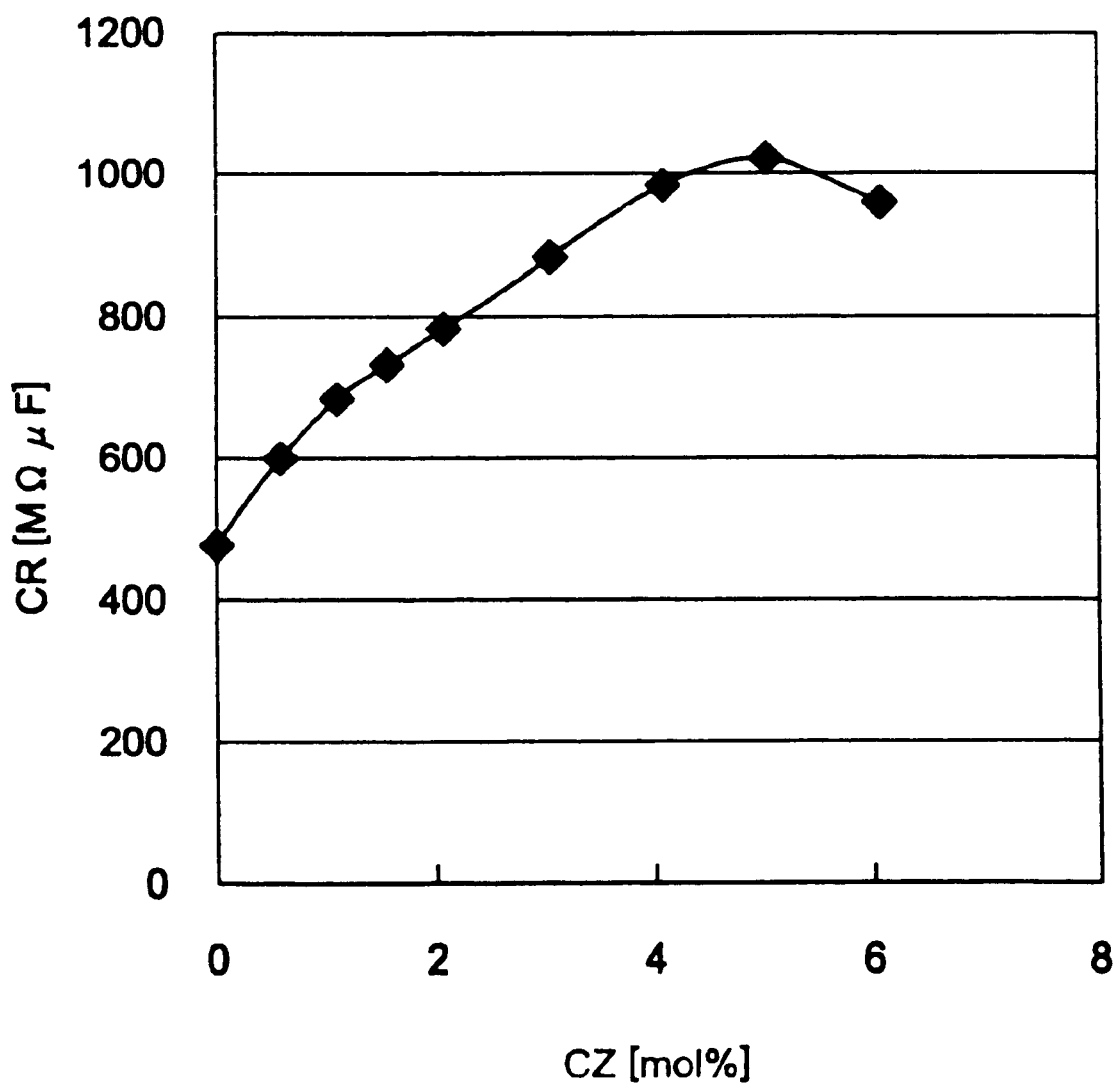
FIG. 5 is a graph of a relationship between a content of the sixth subcomponent and a CR product.

A plurality of samples of capacitors having dielectric layers constituted by a dielectric ceramic composition having a different content of $CaZrO_3$ were prepared in the same way as in the example 101 except that 1.0 mole of $MgCO_3$ as an ingredient of a first subcomponent, 3.0 moles of $(Ba_{0.6}Ca_{0.4})$ $SiO_3$ as a second subcomponent, 0.1 mole of $V_2O_5$ as a third subcomponent, 2.13 moles of $Yb_2O_3$ as a fourth subcomponent, 2.0 moles of $Y_2O_3$ as a fifth subcomponent, 0 to 6.0 moles of $CaZrO_3$ as a sixth subcomponent and $MnCO_3$ as an ingredient of a seventh subcomponent were used with respect to 100 moles of $BaTiO_3$ as a main component and that calcination was not performed. The CR product of the thus obtained samples were obtained in the same way as in the example 101. Relationship of the content of $CaZrO_3$ and the CR product is shown in FIG. 5. as shown in FIG. 5, it was confirmed that a range of CZ is preferably 0 to 5 moles (note that 0 is not included).

Reference Example 104

Figure 6:
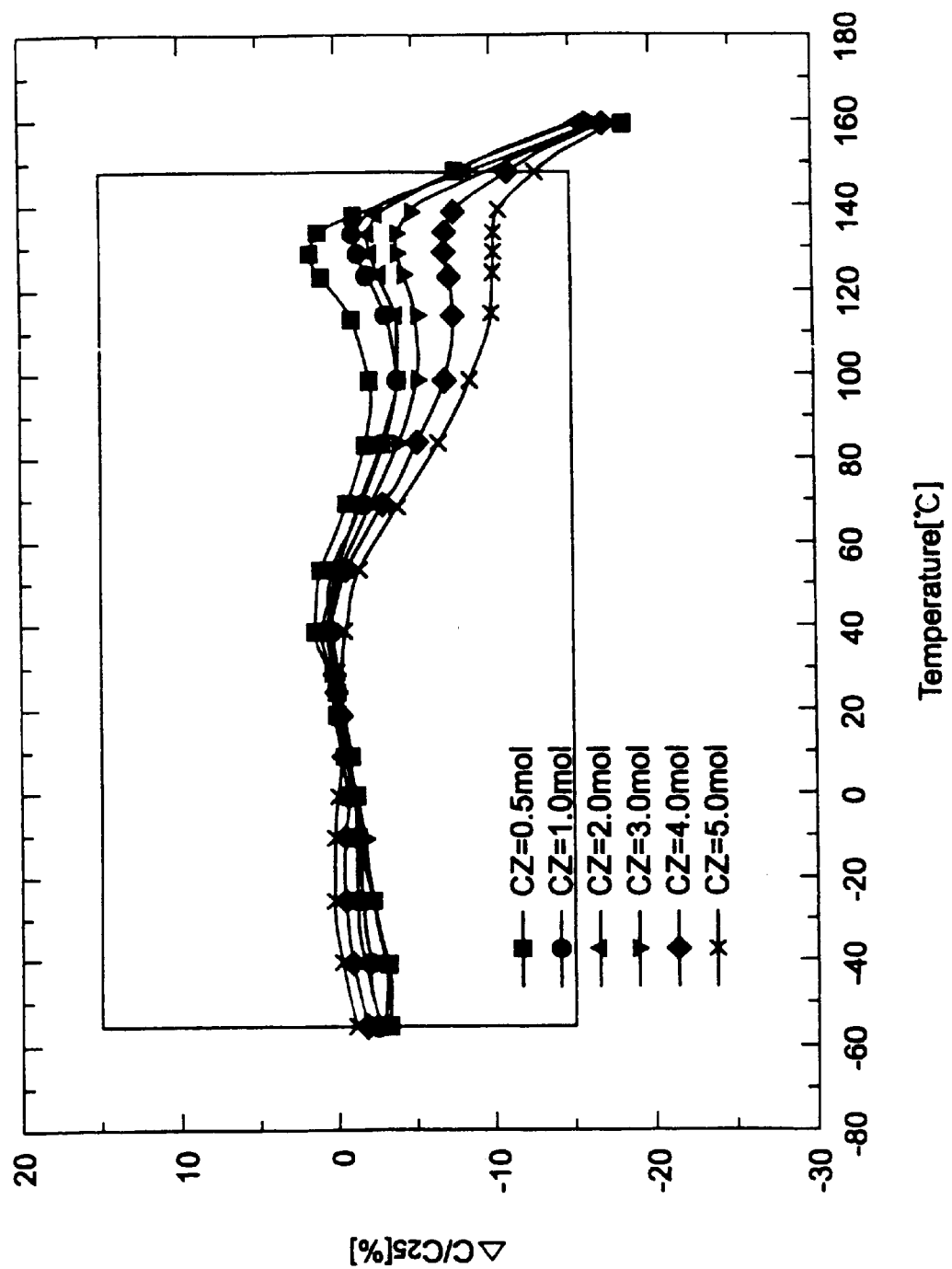
FIG. 6 is a graph of a capacitance-temperature characteristic of dielectric ceramic compositions obtained by reference examples of the present invention.

A plurality of samples of capacitors having dielectric layers constituted by a dielectric ceramic composition having a different content of $CaZrO_3$ in a range of 0.5 to 5.0 moles were prepared in the same way as in the reference example 103, a capacitance in a temperature range of −55 to 160° C. was measured to investigate if the X8R characteristic was satisfied. As shown in FIG. 6, it was confirmed that the X8R characteristic was satisfied when CZ is in the range of 0.5 to 5 moles. Note that a block range wherein the X8R characteristic is satisfied is also indicated in FIG. 6.

EXAMPLE 120

Cylinder-shaped samples and samples of capacitors were prepared in the same way as in the above example 14 except that 3.0 moles of mixed powder of $Li_2O$—$BaO$—$SiO_2$ (molar ratios are 2:4:4) instead of 3.0 moles of BCG was added as a second subcomponent, and the same tests as in the example 14 were conducted. The results are shown in Table 8.

Comparative Example 103

Cylinder-shaped samples and samples of capacitors were prepared in the same way as in the above comparative example 101 except that 3.0 moles of mixed powder of $Li_2O$—$BaO$—$SiO_2$ (molar ratios are 4:2:4) instead of 3.0 moles of BCG was added as a second subcomponent, and the same tests as in the comparative example 101 were conducted. The results are shown in Table 8.

EXAMPLE 121

Cylinder-shaped samples and samples of capacitors were prepared in the same way as in the above example 114 except that 3.0 moles of mixed powder of $B_2O_3$—$BaO$—$SiO_2$ (molar ratios are 1:4.5:4.5) instead of 3.0 moles of BCG was added as a second subcomponent, and the same tests as in the example 114 were conducted. The results are shown in Table

Comparative Example 104

Cylinder-shaped samples and samples of capacitors were prepared in the same way as in the above comparative example 101 except that 3.0 moles of mixed powder of $B_2O_3$—$BaO$—$SiO_2$ (molar ratios are 1:4.5:4.5) instead of 3.0 moles of BCG was added as a second subcomponent, and the same tests as in the comparative example 101 were conducted. The results are shown in Table 8.

EXAMPLE 122

Cylinder-shaped samples and samples of capacitors were prepared in the same way as in the above example 114 except that 3.0 moles of mixed powder of $Li_2O$—$BaO$—$SiO_2$ (molar ratios are 4:2:4) instead of 3.0 moles of BCG was added as a second subcomponent, and the same tests as in the example 114 were conducted. The results are shown in Table 8.

Comparative Example 105

Cylinder-shaped samples and samples of capacitors were prepared in the same way as in the above comparative example 101 except that 3.0 moles of mixed powder of $Li_2O$—$BaO$—$SiO_2$ (molar ratios are 4:2:4) instead of 3.0 moles of BCG was added as a second subcomponent, and the same tests as in the comparative example 101 were conducted. The results are shown in Table 8.

TABLE 8

|  | 2nd Subcomp. | Mole | Calcination YES/NO | T2 | $\epsilon r$ (1kHz) [ ] | tanD (1kHz) [%] | $\rho$ [$\Omega \cdot cm$] | CR Product [M$\Omega$ $\mu$F] | VB [V] | IR Lifetime 200° C. − 15V/[m |
|---|---|---|---|---|---|---|---|---|---|---|
| Ex. 120 | *1 | 3.0 | YES | 1270 | 1777 | 0.55 | 3.3E + 12 | 519 | 1078.9 | 395.6 |
| Comp. Ex. 103 | *1 | 3.0 | NO | 1270 | 1774 | 0.57 | 3.4E + 12 | 534 | 1055.4 | 70.5 |
| Ex. 121 | *2 | 3.0 | YES | 1240 | 1780 | 0.59 | 3.2E + 12 | 504 | 989.2 | 270.1 |
| Comp. Ex. 104 | *2 | 3.0 | NO | 1240 | 1773 | 0.62 | 3.4E + 12 | 534 | 945.5 | 56.4 |
| Ex. 122 | *3 | 3.0 | YES | 1200 | 1775 | 0.57 | 3.4E + 12 | 534 | 1025.0 | 402.1 |

TABLE 8-continued

|  | 2nd Subcomp. | Mole | Calcination YES/NO | T2 | ϵr (1kHz) [ ] | tanD (1kHz) [%] | ρ [Ω·cm] | CR Product [MΩ μF] | VB [V] | IR Lifetime 200° C. − 15V/[m |
|---|---|---|---|---|---|---|---|---|---|---|
| Comp. Ex. 105 | * 3 | 3.0 | NO | 1200 | 1710 | 0.56 | 3.4E + 12 | 532 | 1150.0 | 98.8 |
| Ex. 114 | BCG | 3.0 | YES | 1300 | 1872 | 0.59 | 3.5E + 12 | 522 | 1095.0 | 400.3 |

* 1: $Li_2O$—$BaO$—$SiO_2$ (2:4:4)
* 2: $B_2O_3$—$BaO$—$SiO_2$ (1:4.5:4.5)
* 3: $Li_2O$—$BaO$—$SiO_2$ (4:2:4)

Evaluation 2

Figure 7:
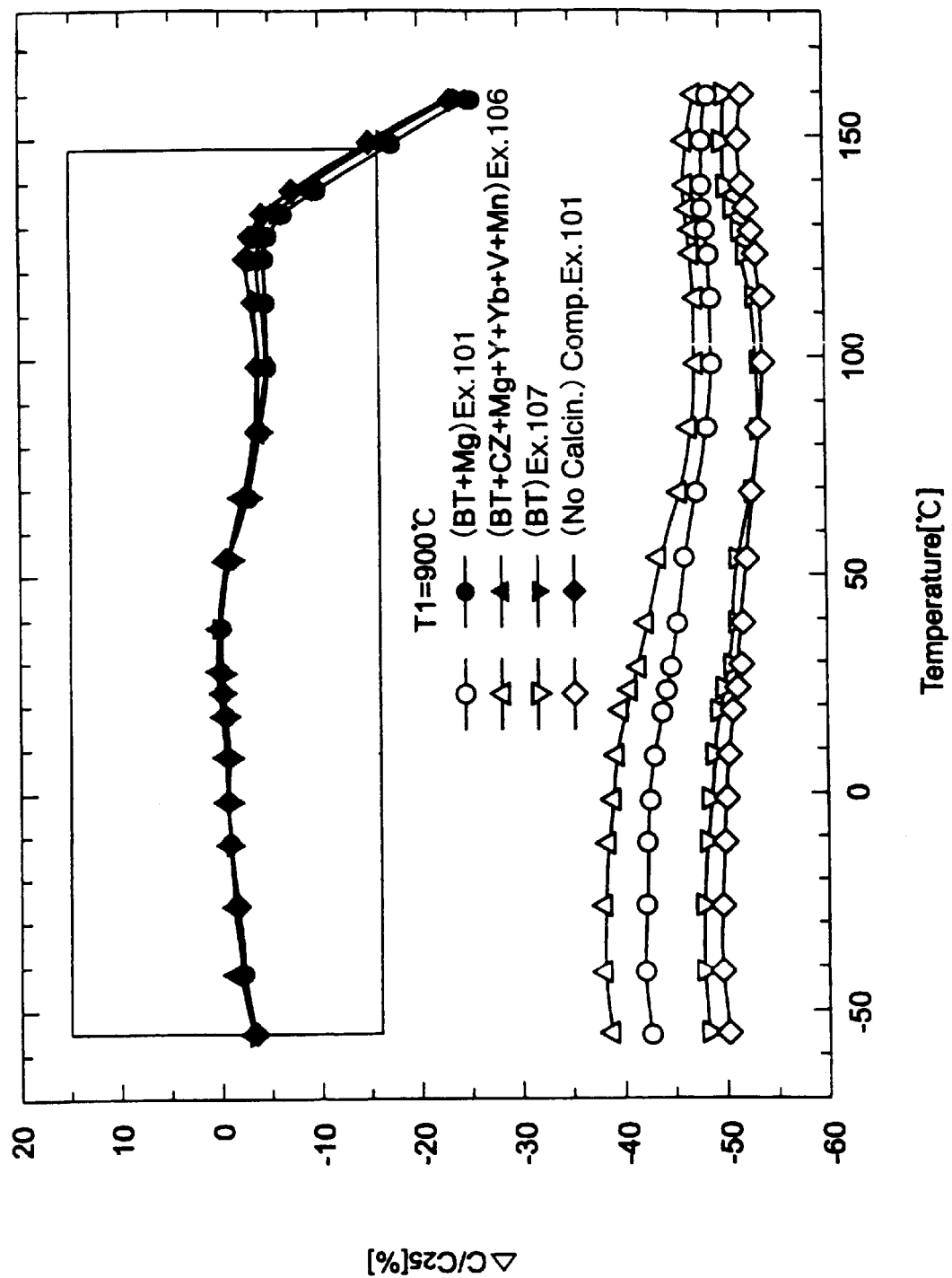
FIG. 7 is a graph of a capacitance-temperature characteristic and a bias characteristic of dielectric ceramic compositions obtained by examples of the present invention.

As shown in Tables 5 to 7, by comparing the examples 101 to 107 with the comparative example 101 of the present invention, the permittivity, dielectric loss, CR product, etc. are not largely different, but it was confirmed that the bias characteristic (DC bias characteristic (DC voltage application dependency of the permittivity) and TC bias characteristic (the capacitance-temperature characteristic at the time of DC voltage application)) remarkably improved in the examples comparing with the comparative example as shown in FIG. 7. Note that, in FIG. 7, graphs with black dots on the upper side indicate usual temperature characteristic, and graphs with white dots on the lower side indicate the temperature characteristic in a state that a DC electric field of $5V/\mu m$ is applied.

Particularly, as shown in the examples 103 to 106, 108 to 111, 113 to 116, it was confirmed that the IR lifetime was particularly improved comparing with those in other examples when the molar ratio of a component $(Ba+Mg+Ca)/(Ti+Zr+Yb+Y)$ contained in the pre-calcination powder was less than 1 or $(Ba+Ca+Yb+Y)/(Ti+Mg+Zr)$ exceeded 1.

Also, by comparing the example 101 with the example 107, it was confirmed that the CR product was improved when $MgCO_3$ as an ingredient of a first subcomponent was contained in the pre-calcination powder at the time of preparing the pre-calcination powder.

Also, by comparing the examples 103 to 106 with other examples, it was confirmed that the IR lifetime was improved when the number of moles of $MgCO_3$ as an ingredient of a first subcomponent is made smaller than the total number of moles of $YbO_2O_3$ as a fourth subcomponent and $Y_2O_3$ as a fifth subcomponent contained in the pre-calcination powder.

Also, by comparing the example 102 with the comparative example 102, it was confirmed that the CR product could be increased when $CaZrO_3$ as a sixth subcomponent is contained in the dielectric ceramic composition according to a method of the present invention. This was obvious also from the reference example 103 shown in FIG. 5.

Also, by comparing the examples 113 to 116 with the reference examples 101 and 102, it was confirmed that the calcination temperature was preferably 700 to 1100° C.

Furthermore, by referring to FIG. 8, it was proven that the degree of dispersion of Ca was particularly improved due to a rise of the calcination temperature. Also, by referring to FIG. 9 to FIG. 15, it was confirmed that sintering and particle growing of additives abruptly started when the calcination temperature became 900° C. or more. Furthermore, by observing FIG. 9 to FIG. 15, components of additives were found to be deposited on the surface of barium titanate due to calcination, so it was proven that a pseudo coating by the additives was realized.

Furthermore, from the results shown in FIG. 6 and FIG. 7, it was confirmed that the X8R characteristic can be satisfied in the examples of the present invention.

Also, by comparing the examples 103 to 106 with the examples 101, 102 and 107, it was confirmed that the IR lifetime characteristic was improved when a rare-earth element (Y or Yb, etc.) was contained at the time of calcination. It was also confirmed that the IR lifetime characteristic was improved by essentially using $Y_2O_3$ as a fifth subcomponent than using $Yb_2O_3$ as a fourth subcomponent at the time of calcination.

From the results shown in FIG. 5, FIG. 6 and Tables 5 to 7, it was proven that the samples of the examples satisfy the X8R characteristic, have a sufficiently high specific permittivity and insulation resistance, have an excellent IR lifetime characteristic and a small dielectric loss. Note that the samples of the examples also satisfied the B characteristic of the EIAJ standard and the X7R characteristic of the EIA standard described above.

Furthermore, from the results shown in Table 8, it was confirmed that the effects of the present invention can be also obtained when using as a second subcomponent a sintering aid wherein silicone oxide other than BCG was a main component.

As explained above, according to the present invention, it is possible to produce highly reliable dielectric ceramic composition able to be used as a dielectric ceramic composition for a multilayer chip capacitor, etc., wherein base metals, such as Ni, Ni alloy, etc., can be used as internal electrodes, segregation of a different phase other than the main composition can be suppressed, the fine configuration of a dielectric is controlled, the capacitance-temperature characteristic can satisfy the X8R characteristic, and the dielectric loss, CR product and IR lifetime are improved.

What is claimed is:

1. A method of manufacturing a dielectric ceramic composition, including at least:

a main component constituted by barium titanate has a composition expressed by $Ba_mTiO_{2+m}$ where m is $0.995 \leq m \leq 1.010$ and a ratio of Ba and Ti is $0.995 \leq Ba/Ti \leq 1.010$;

a second subcomponent as a sintering aid and having a ratio of 2 to 10 moles with respect to 100 moles of the main component, said second subcomponent containing $SiO_2$ as a main component and at least one type selected from MO (note that M is at least one type of element selected from Ba, Ca, Sr and Mg), $Li_2O$ and $B_2O_3$; and other subcomponents comprising at least:

a first subcomponent containing at least one type selected from MgO, CaO, BaO, SrO and $Cr_2O_3$;

a third subcomponent containing at least one type selected from $V_2O_5$, $MoO_3$ and $WO_3$; and a fourth subcomponent containing an oxide of R1 (note that R1 is at least one type selected from Sc, Er, Tm, Yb and Lu;

comprising the steps of:
mixing in said main component at least part of other subcomponents except for the second subcomponent to prepare a pre-calcination powder;
calcining said pre-calcination powder to prepare a calcined powder; and
mixing at least said second subcomponent in said calcined powder to obtain a dielectric ceramic composition having ratios of the respective subcomponents with respect to 100 moles of the main component being predetermined molar ratios which are:
the first subcomponent: 0.1 to 3 moles,
the third subcomponent: 0.01 to 0.5 mole, and
the fourth subcomponent: 0.5 to 7 moles (where, the number of moles of the fourth subcomponent is the ratio of R1 by itself).

2. The method of manufacturing a dielectric ceramic composition as set forth in claim 1, wherein:
said second subcomponent contains at least $SiO_2$.

3. The method of manufacturing a dielectric ceramic composition as set forth in claim 1, wherein said pre-calcination powder is prepared so that the molar ratio of components contained in said pre-calcination powder (Ba+metal element of the first subcomponent)/(Ti+metal element of the fourth subcomponent) is less than 1, or (Ba+metal element of the fourth subcomponent)/(Ti+metal element of the first subcomponent) is over 1, and calcination is performed.

4. The method of manufacturing a dielectric ceramic composition as set forth in claim 1, wherein:
said second subcomponent contains $SiO_2$ as a main component and at least one type selected from MO (note that M is at least one type of element selected from Ba, Ca, Sr and Mg), $Li_2O$ and $B_2O_3$;
said other subcomponents comprises at least
a first subcomponent containing at least one type selected from MgO, CaO, BaO, SrO and $Cr_2O_3$;
a third subcomponent containing at least one type selected from $V_2O_5$, $MoO_3$ and $WO_3$; and
a fourth subcomponent containing an oxide of R1 (note that R1 is at least one type selected from Sc, Er, Tm, Yb and Lu); and
a fifth subcomponent containing an oxide of R2 (note that R2 is at least one type selected from Y, Dy, Ho, Tb, Gd and Eu); and
said calcined powder is mixed at least said second subcomponent and ratios of the respective subcomponents with respect to 100 moles of said main component are:
the first subcomponent: 0.1 to 3 moles,
the second subcomponent: 2 to 10 moles,
the third subcomponent: 0.01 to 0.5 mole,
the fourth subcomponent: 0.5 to 7 moles, (where, the number of moles of the fourth subcomponent is the ratio of RI by itself); and
the fifth subcomponent: 2 to 9 moles, (where, the number of moles of the fifth subcomponent is the ratio of R2 by itself).

5. The method of manufacturing a dielectric ceramic composition as set forth in claim 4, wherein said pre-calcination powder is prepared so that the molar ratio of components contained in said pre-calcination powder (Ba+metal element of the first subcomponent)/(Ti+metal element of the fourth subcomponent+metal element of the fifth subcomponent) is less than 1, or (Ba+metal element of the fourth subcomponent+metal element of the fifth subcomponent)/(Ti+metal element of the first subcomponent) is over 1, and calcination is performed.

6. The method of manufacturing a dielectric ceramic composition as set forth in claim 4, wherein said main component and at least one of said first subcomponent, third subcomponent, fourth subcomponent and fifth subcomponent except for the second subcomponent are mixed, and the fifth subcomponent is always contained in pre-calcination powder when preparing the pre-calcination powder.

7. The method of manufacturing a dielectric ceramic composition as set forth in claim 4, wherein said main component and at least one of said first subcomponent, third subcomponent, fourth subcomponent and fifth subcomponent except for the second subcomponent are mixed, and the fourth subcomponent is not contained in pre-calcination powder when preparing the pre-calcination powder.

8. The method of manufacturing a dielectric ceramic composition as set forth in claim 4, wherein said main component and at least one of said first subcomponent, third subcomponent, fourth subcomponent and fifth subcomponent except for the second subcomponent are mixed, and the first subcomponent is always contained in pre-calcination powder when preparing the pre-calcination powder.

9. The method of manufacturing a dielectric ceramic composition as set forth in claim 8, wherein the number of moles of the first subcomponent contained in said pre-calcination powder is smaller than the total number of moles of the fourth subcomponent and fifth subcomponent (note that the numbers of moles of the fourth subcomponent and fifth subcomponent are ratios of R1 by itself and R2 by itself, respectively).

10. The method of manufacturing a dielectric ceramic composition as set forth in claim 1, wherein said pre-calcination powder is calcined at a temperature of 700 to 1100° C.

11. The method of manufacturing a dielectric ceramic composition as set forth in claim 1, wherein said calcination is performed for a plurality of times.

12. A method of manufacturing a dielectric ceramic composition, including at least:
a main component constituted by barium titanate has a composition expressed by $Ba_mTiO_{2+m}$ where m is $0.995 \leq m \leq 1.010$ and a ratio of Ba and Ti is $0.995 \leq Ba/Ti \leq 1.010$;
a second subcomponent as a sintering aid and having a ratio of 2 to 10 moles with respect to 100 moles of the main component said second subcomponent containing $S_iO_2$ as a main component and containing at least one type selected from MO (note that M is at lest one type of element selected from Ba, Ca, Sr and Mg), $Li_2O$ and $B_2O_3$;
a sixth subcomponent containing $CaZrO_3$ or $CaO+ZrO_2$; and
other subcomponents comprising at least:
a first subcomponent containing at least one type selected from MgO, CaO, BaO, SrO and $Cr_2O_3$;
a third subcomponent containing at least one type selected from $V_2O_5$, $MoO_3$ and $WO_3$; and
a fourth subcomponent containing an oxide of R1 (note that R1 is at least one type selected from Sc, Er, Tm, Yb and Lu);
comprising the steps of:
mixing in said main component said sixth subcomponent and at least part of other subcomponents except for the second subcomponent to prepare a pre-calcination powder;
calcining said pre-calcination powder to prepare a calcined powder; and mixing at least said second subcomponent in said calcined powder to obtain a dielectric ceramic composition having ratios of the respective subcomponents with respect to 100 moles of the main component being predetermined molar ratios which are:
the first subcomponent: 0.1 to 3 moles,
the third subcomponent: 0.01 to 0.5 mole,
the fourth subcomponent: 0.5 to 7 moles (where, the number of moles of the fourth subcomponent is the ratio of R1 by itself); and
the sixth subcomponent: 0 to 5 moles (note that 0 is not included).

13. The method of manufacturing a dielectric ceramic composition as set forth in claim 12, wherein:
said second subcomponent contains at least $SiO_2$.

14. The method of manufacturing a dielectric ceramic composition as set forth in claim 12, wherein said pre-calcination powder is prepared so that the molar ratio of components contained in said pre-calcination powder (Ba+Ca+metal element of the first subcomponent)/(Ti+Zr+R1) is less than 1, or (Ba+Ca+R1)/(Ti+Zr+metal element of the first subcomponent) is over 1, and calcination is performed.

15. The method of manufacturing a dielectric ceramic composition as set forth in claim 12, wherein:
said barium titanate as the main component has a composition expressed by $Ba_mTiO_{2+m}$ where m is $0.995 \leq m \leq 1.010$ and a ratio of Ba and Ti is $0.995 \leq Ba/Ti \leq 1.010$;
said second subcomponent contains $SiO_2$ as a main component and at least one type selected from MO (note that M is at least one type of element selected from Ba, Ca, Sr and Mg), $Li_2O$ and $B_2O_3$;
said other subcomponents comprises at least
  a first subcomponent containing at least one type selected from MgO, CaO, BaO, SrO and $Cr_2O_3$;
  a third subcomponent containing at least one type selected from $V_2O_5$, $MoO_3$ and $WO_3$; and
  a fourth subcomponent containing an oxide of R1 (note that R1 is at least one type selected from Sc, Er, Tm, Yb and Lu); and
  a fifth subcomponent containing an oxide of R2 (note that R2 is at least one type selected from Y, Dy, Ho, Tb, Gd and Eu); and
said calcined powder is mixed at least said second subcomponent and ratios of the respective subcomponents with respect to 100 moles of said main component are:
the first subcomponent: 0.1 to 3 moles,
  the second subcomponent: 2 to 10 moles,
  the third subcomponent: 0.01 to 0.5 mole,
  the fourth subcomponent: 0.5 to 7 moles (where, the number of moles of the fourth subcomponent is the ratio of R1 by itself);
  the fifth subcomponent: 2 to 9 moles (where, the number of moles of the fifth subcomponent is the ratio of R2 by itself); and
  the sixth subcomponent: 0 to 5 moles (note that 0 is not included).

16. The method of manufacturing a dielectric ceramic composition as set forth in claim 15, wherein said pre-calcination powder is prepared so that the molar ratio of components contained in said pre-calcination powder (Ba+Ca+metal element of the first subcomponent)/(Ti+Zr+R1+R2) is less than 1, or (Ba+Ca+R1+R2)/(Ti+Zr+metal element of the first subcomponent) is over 1, and calcination is performed.

17. The method of manufacturing a dielectric ceramic composition as set forth in claim 15, wherein said main component and at least one of said first subcomponent, third subcomponent, fourth subcomponent, fifth subcomponent and sixth subcomponent except for the second subcomponent are mixed, and the fifth subcomponent is always contained in pre-calcination powder when preparing the pre-calcination powder.

18. The method of manufacturing a dielectric ceramic composition as set forth in claim 15, wherein said main component and at least one of said first subcomponent, third subcomponent, fourth subcomponent, fifth subcomponent and sixth subcomponent except for the second subcomponent are mixed, and the first subcomponent is always contained in pre-calcination powder when preparing the pre-calcination powder.

19. The method of manufacturing a dielectric ceramic composition as set forth in claim 15, wherein said main component and at least one of said first subcomponent, third subcomponent, fourth subcomponent, fifth subcomponent and sixth subcomponent except for the second subcomponent are mixed, and the first subcomponent, the fourth subcomponent and the fifth subcomponent are always contained in pre-calcination powder when preparing the pre-calcination powder.

20. The method of manufacturing a dielectric ceramic composition as set forth in claim 19, wherein the number of moles of the first subcomponent contained in said pre-calcination powder is smaller than the total number of moles of the fourth subcomponent and fifth subcomponent (note that the numbers of moles of the fourth subcomponent and fifth subcomponent are ratios of R1 by itself and R2 by itself, respectively).

21. The method of manufacturing a dielectric ceramic composition as set forth in claim 12, wherein said pre-calcination powder is calcined at a temperature of 700 to 1100° C.

22. The method of manufacturing a dielectric ceramic composition as set forth in claim 12, wherein said calcination is performed for a plurality of times.

* * * * *